(12) United States Patent
Ogura

(10) Patent No.: US 11,943,401 B2
(45) Date of Patent: Mar. 26, 2024

(54) IMAGE PROCESSING APPARATUS, DISPLAY CONTROL APPARATUS, DISPLAY CONTROL METHOD, AND MEDIUM STORING PROGRAM EXECUTABLE BY DISPLAY CONTROL APPARATUS

(71) Applicant: Brother Kogyo Kabushiki Kaisha, Nagoya (JP)

(72) Inventor: Sho Ogura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/385,352

(22) Filed: Jul. 26, 2021

(65) Prior Publication Data

US 2021/0352184 A1 Nov. 11, 2021

Related U.S. Application Data

(63) Continuation of application No. 16/581,072, filed on Sep. 24, 2019, now Pat. No. 11,082,572.

(30) Foreign Application Priority Data

Sep. 28, 2018 (JP) .................................. 2018-184739

(51) Int. Cl.
*H04N 1/00* (2006.01)
(52) U.S. Cl.
CPC ..... *H04N 1/00514* (2013.01); *H04N 1/00432* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0105365 | A1* | 4/2010 | Kakiwaki | H04M 1/724 |
| | | | | 455/566 |
| 2012/0099130 | A1* | 4/2012 | Tohki | G03G 15/502 |
| | | | | 358/1.13 |
| 2014/0101138 | A1* | 4/2014 | Sugita | G06F 3/0482 |

FOREIGN PATENT DOCUMENTS

JP 2016-071680 A 5/2016

* cited by examiner

*Primary Examiner* — Frantz Bataille
(74) *Attorney, Agent, or Firm* — Banner & Witcoff, Ltd.

(57) ABSTRACT

An image processing apparatus includes: a printer; a scanner; a display; an input interface; and a controller. The controller executes a display process for causing the display to display a standby screen included in a plurality of screens and configured to be switchable to another screen. Icons which are images associated with functions respectively are registered for each of the screens. One of a common attribute and a personal attribute is set to each of the screens. The icons include at least one icon associated with a printing function of the printer and at least one icon associated with the scanning function of the scanner. The controller further executes: a main screen setting process for setting one of the screens as a main screen; and a user mode setting process for setting a user mode for the image processing apparatus to one of an ordinary mode and an individual mode.

24 Claims, 19 Drawing Sheets

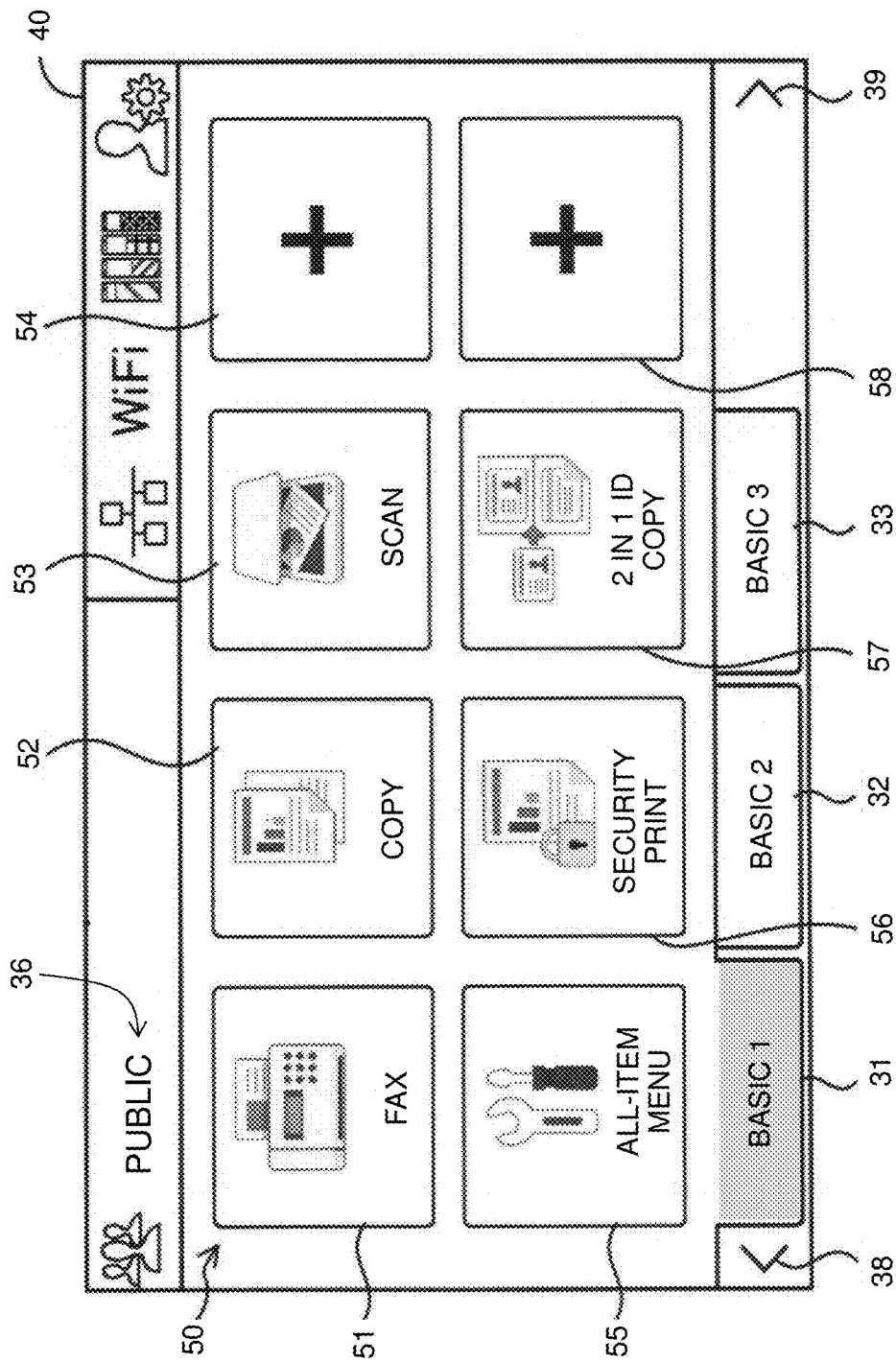

Fig. 3A

MAIN HOME SCREEN TAB SETTING TABLE

| MAIN HOME SCREEN TAB | FIRST TAB |
|---|---|

Fig. 3B

TAB SETTING TABLE

| INDEX | TAB ATTRIBUTE | TAB NAME | ICON NUMBER |
|---|---|---|---|
| FIRST TAB | COMMON | BASIC 1 | 6 |
| SECOND TAB | COMMON | BASIC 2 | 0 |
| THIRD TAB | COMMON | BASIC 3 | 3 |
| FOURTH TAB | PERSONAL | CUSTOM 1 | 1 |
| FIFTH TAB | PERSONAL | CUSTOM 2 | 1 |
| SIXTH TAB | PERSONAL | CUSTOM 3 | 1 |
| SEVENTH TAB | PERSONAL | CUSTOM 4 | 1 |
| EIGHTH TAB | PERSONAL | CUSTOM 5 | 1 |
| ⋮ | ⋮ | ⋮ | ⋮ |
| N-TH TAB | PERSONAL | xxx | |

Fig. 3C

USER LIST

| USER NAME | INDIVIDUAL REGISTRATION TAB | INDIVIDUAL MAIN HOME SCREEN TAB |
|---|---|---|
| USER A | FOURTH TAB | FOURTH TAB |
| USER B | FIFTH TAB | FIRST TAB |
| USER C | SECOND TAB | SECOND TAB |
| USER D | OFF | OFF |
| ⋮ | ⋮ | ⋮ |

Fig. 3D

INDIVIDUAL MAIN HOME SCREEN TAB SETTING TABLE OF INDIVIDUAL REGISTRATION TAB

| SET INDIVIDUAL REGISTRATION TAB AS INDIVIDUAL MAIN HOME SCREEN TAB | ON |
|---|---|

Fig. 4

TAB ATTRIBUTE SETTING SCREEN

| | | | |
|---|---|---|---|
| 71 → | FIRST TAB | ● COMMON ○ PERSONAL | ☆ |
| 72 → | SECOND TAB | ● COMMON ○ PERSONAL | |
| 73 → | THIRD TAB | ● COMMON ○ PERSONAL | |
| 74 → | FOURTH TAB | ○ COMMON ● PERSONAL | |
| 75 → | FIFTH TAB | ○ COMMON ● PERSONAL | |
| 76 → | SIXTH TAB | ○ COMMON ● PERSONAL | |
| 77 → | SEVENTH TAB | ○ COMMON ● PERSONAL | |
| 78 → | EIGHTH TAB | ○ COMMON ● PERSONAL | |

Fig. 5

MAIN HOME SCREEN SETTING

| | | |
|---|---|---|
| 35a | FIRST TAB | BASIC 1 |
| 35b | SECOND TAB | BASIC 2 |
| 35c | THIRD TAB | BASIC 3 |
| 35d | FOURTH TAB | CUSTOM 1 |
| 35e | FIFTH TAB | CUSTOM 2 |

IMAGE PROCESSING APPARATUS, DISPLAY CONTROL APPARATUS, DISPLAY CONTROL METHOD, AND MEDIUM STORING PROGRAM EXECUTABLE BY DISPLAY CONTROL APPARATUS

CROSS REFERENCE TO RELATED APPLICATION

This application is a Continuation of U.S. application Ser. No. 16/581,072 filed on Sep. 24, 2019, which application claims priority from Japanese Patent Application No. 2018-184739, filed on Sep. 28, 2018, the disclosures of which are incorporated herein by reference in their entirety.

BACKGROUND

Field of the Invention

The present invention relates to a technique of controlling screen items displayed in a display.

Description of the Related Art

Japanese Patent Application Laid-open No. 2016-71680 discloses a multifunction apparatus where a shortcut list screen is displayed in a tab form. In the shortcut list screen of the tab form, if any one of the displayed tabs is set into a selected state, then such a screen is displayed as including options for a shortcut function associated with the tab in the selected state.

In the multifunction apparatus disclosed in Japanese Patent Application Laid-open No. 2016-71680, in an ordinary mode where no registered user has logged in, on the shortcut list screen, there is displayed a common tab which can be used by all users. On the other hand, in an individual mode where any registered user has logged in, on the shortcut list screen, the common tab is not displayed but only an individual tab is displayed for the registered user who has logged in.

SUMMARY

With respect to the multifunction apparatus disclosed in Japanese Patent Application Laid-open No. 2016-71680, such a usage pattern is conceivable, for example, as to preset any common tab for a main tab which is the initial value of the tab being first set into the selected state after starting the operation in the ordinary mode such as at the time of startup, at the time of switching to the ordinary mode, or the like.

However, problems as follows may occur with such kind of usage pattern. That is, in the case of such a configuration that it is possible to change the setting of attribute to the common tab or the individual tab for each tab, the main tab can be changed in attribute from the common tab to the individual tab. If the main tab is changed in attribute to the individual tab, then it is difficult for the multifunction apparatus to specify the tab which should be set into the selected state after starting the operation in the ordinary mode.

The present teaching is made in view of the above problems, and an object thereof is to provide a display control apparatus where a screen of tab form is displayed and, in the case of such a configuration that it is possible to determine the initial value of a tab being first set into the selected state after starting the operation in the ordinary mode, even if the attribute of the tab whose initial value is determined is changed to the attribute displayed in the individual mode, an appropriate screen is still displayed after the operation is started in the ordinary mode.

According to a first aspect of the present teaching, there is provided an image processing apparatus including: a printer; a scanner; a display; an input interface; and a controller. The controller is configured to execute a display process for causing the display to display a standby screen. The standby screen is included in a plurality of screens and configured to be switchable to another screen. Icons which are images associated with functions respectively are registered for each of the screens. One of a common attribute and a personal attribute is set to each of the screens. A specific registered user is registered for each of the screens. The icons include at least one icon associated with a printing function of the printer and at least one icon associated with the scanning function of the scanner. The controller is further configured to execute: a main screen setting process for setting one of the screens as a main screen; and a user mode setting process for setting a user mode for the image processing apparatus to one of an ordinary mode in which no registered user has logged in to the image processing apparatus and an individual mode in which a registered user has logged in to the image processing apparatus, and for setting the user mode to the individual mode in accordance with an input of user authentication information corresponding to the registered user via the input interface. The display process includes: a first display process for causing the display to display the standby screen in accordance with the user mode being set to the ordinary mode; and a second display process for causing the display to display the standby screen in accordance with the user mode being set to the individual mode. In a case that the controller executes the first display process, a common attribute screen set with the common attribute is displayed as the standby screen, but no personal attribute screen set with the personal attribute is displayed in the display. If the main screen is set with the common attribute, then the main screen is displayed as the standby screen, and If the main screen is set with the personal attribute, then the main screen is not displayed and another common attribute screen is displayed as the standby screen. In a case that the controller executes the second display process, a personal attribute screen registered with the registered user is displayed as the standby screen, and no personal attribute screen registered with another registered user is displayed as the standby screen.

According to a second aspect of the present teaching, there is provided a display control method of an image processing apparatus including: a printer; a scanner; a display; and an input interface. The method includes: displaying a standby screen, the standby screen being included in a plurality of screens and configured to be switchable to another screen. Icons which are images associated with functions respectively are registered for each of the screens. One of a common attribute and a personal attribute is set to each of the screens. A specific registered user is registered for each of the screens. The icons include at least one icon associated with a printing function of the printer and at least one icon associated with the scanning function of the scanner. The display control method further includes: setting one of the screens as a main screen; and setting a user mode for the image processing apparatus to one of an ordinary mode in which no registered user has logged in to the image processing apparats and an individual mode in which a registered user has logged in to the image processing apparatus, and setting the user mode to the individual mode in accordance with an input of user authentication information corresponding to the registered user via the input interface. Displaying the standby screen includes: displaying the standby screen on the display in accordance with the user mode being set to the ordinary mode; and displaying the standby screen on the display in accordance with the user mode being set to the individual mode. When displaying the standby screen on the display in accordance with the user mode being set to the ordinary mode, a common attribute screen set with the common attribute is displayed as the standby screen, but no personal attribute screen set with the personal attribute is displayed in the display. If the main screen is set with the common attribute, then the main screen is displayed as the standby screen, and if the main screen is set with the personal attribute, then the main screen is not displayed and another common attribute screen is displayed as the standby screen. When displaying the standby screen on the display in accordance with the user mode being set to the individual mode, a personal attribute screen registered with the registered user is displayed as the standby screen, and no personal attribute screen registered with another registered user is displayed as the standby screen.

According to a third aspect of the present teaching, there is provided a non-transitory medium storing a program executable by a processor of an image processing apparatus including: a printer; a scanner; a display; an input interface; and a controller. The program, when executed by the processor, causes the controller to execute: a display process for displaying a standby screen on the display, the standby screen being included in a plurality of screens and configured to be switchable to another screen. Icons which are images associated with functions respectively are registered for each of the screens. One of a common attribute and a personal attribute is set to each of the screens. A specific registered user is registered for each of the screens. The icons include at least one icon associated with a printing function of the printer and at least one icon associated with the scanning function of the scanner. The program further causes the controller to execute: a main screen setting process for setting one of the screens as a main screen; and a user mode setting process for setting a user mode for the image processing apparatus to one of an ordinary mode in which no registered user has logged in to the image processing apparatus and an individual mode in which a registered user has logged in to the image processing apparatus, and for setting the user mode to the individual mode in accordance with an input of user authentication information corresponding to the registered user via the input interface. The display process includes: a first display process for displaying the standby screen on the display in accordance with the user mode being set to the ordinary mode; and a second display process for displaying the standby screen on the display in accordance with the user mode being set to the individual mode. In the first display process, a common attribute screen set with the common attribute is displayed as the standby screen, but no personal attribute screen set with the personal attribute is displayed in the display. If the main screen is set with the common attribute, then the main screen is displayed as the standby screen, and if the main screen is set with the personal attribute, then the main screen is not displayed and another common attribute screen is displayed as the standby screen. In the second display process, a personal attribute screen registered with the registered user is displayed as the standby screen, and no personal attribute screen registered with another registered user is displayed as the standby screen.

According to a fourth aspect of the present teaching, there is provided an image processing apparatus including: a printer; a user interface; and a controller. In a case that no user has logged in to the image processing apparatus, the controller is configured to: cause the user interface to display a first main screen, the first main screen being selected from a plurality of screens each of which is associated with no user. In a case of receiving an instruction to switch the first main screen via the user interface in a state of the first main screen being displayed in the user interface, the controller causes the user interface to switch the first main screen to another screen which has not been selected as the first main screen, the another screen being included in the plurality of screens each of which is associated with no user. In a case that a user has logged in to the image processing apparatus, the controller is configured to: cause the user interface to display a second main screen, the second main screen being selected from a group consisting of a plurality of screens each of which is associated with the user and a plurality of screens each of which is associated with no user. In a case of receiving an instruction to switch the second main screen via the user interface in a state of the second main screen being displayed in the user interface, the controller causes the user interface to switch the second main screen to still another screen which has not been selected as the second main screen, the still another screen being included in the group consisting of the plurality of screens each of which is associated with the user and the plurality of screens each of which is associated with no user.

According to a fifth aspect of the present teaching, there is provided an image processing apparatus including: a printer; a user interface; and a controller. In a case that a user has logged in to the image processing apparatus, the controller causes the user interface to display a main screen. The main screen is selected from a group consisting of a plurality of screens each of which is associated with the user and a plurality of screens each of which is associated with no user. In a case of receiving an instruction to switch the main screen via the user interface in a state of the main screen being displayed in the user interface, the controller causes the user interface to switch the main screen to another screen which has not been selected as the main screen. The other screen is included in the group consisting of the plurality of screens each of which is associated with the user and the plurality of screens each of which is associated with no user.

BRIEF DESCRIPTION OF THE DRAWINGS

FIGS. 2A and 2B are illustration diagrams depicting examples of a home screen in an ordinary mode in the case of setting a main home screen setting value to a first tab, wherein FIG. 2A shows an example of the home screen in the case where the first tab to a third tab are of a common attribute, and FIG. 2B shows an example of the home screen in the case where the first tab is changed from the state of FIG. 2A to a personal attribute.

FIG. 3A is an illustration diagram depicting a main home screen tab setting table, FIG. 3B is an illustration diagram depicting a tab setting table, FIG. 3C is an illustration diagram depicting a user list, and FIG. 3D is an illustration diagram depicting an individual main home screen tab setting table of an individual registration tab.

FIG. 4 is an illustration diagram depicting a tab attribute setting screen.

FIG. 5 is an illustration diagram depicting a main home screen setting screen.

FIGS. 6A to 6C are illustration diagrams depicting examples of the home screen in an individual mode in the case of setting the main home screen setting value to the first tab, wherein FIG. 6A shows an example of the home screen in the case where the setting is ON for the individual registration tab to be an individual main home screen tab, FIG. 6B shows an example of the home screen in the case where the setting is OFF for the individual registration tab to be the individual main home screen tab, and FIG. 6C shows an example of the home screen in the case where the first tab is changed from the state of FIG. 6B to the personal attribute.

DESCRIPTION OF THE EMBODIMENT

Hereinbelow, referring to the accompanied drawings, an embodiment of the present teaching will be explained.

<Outline of an Information Processing System>

Figure 1:
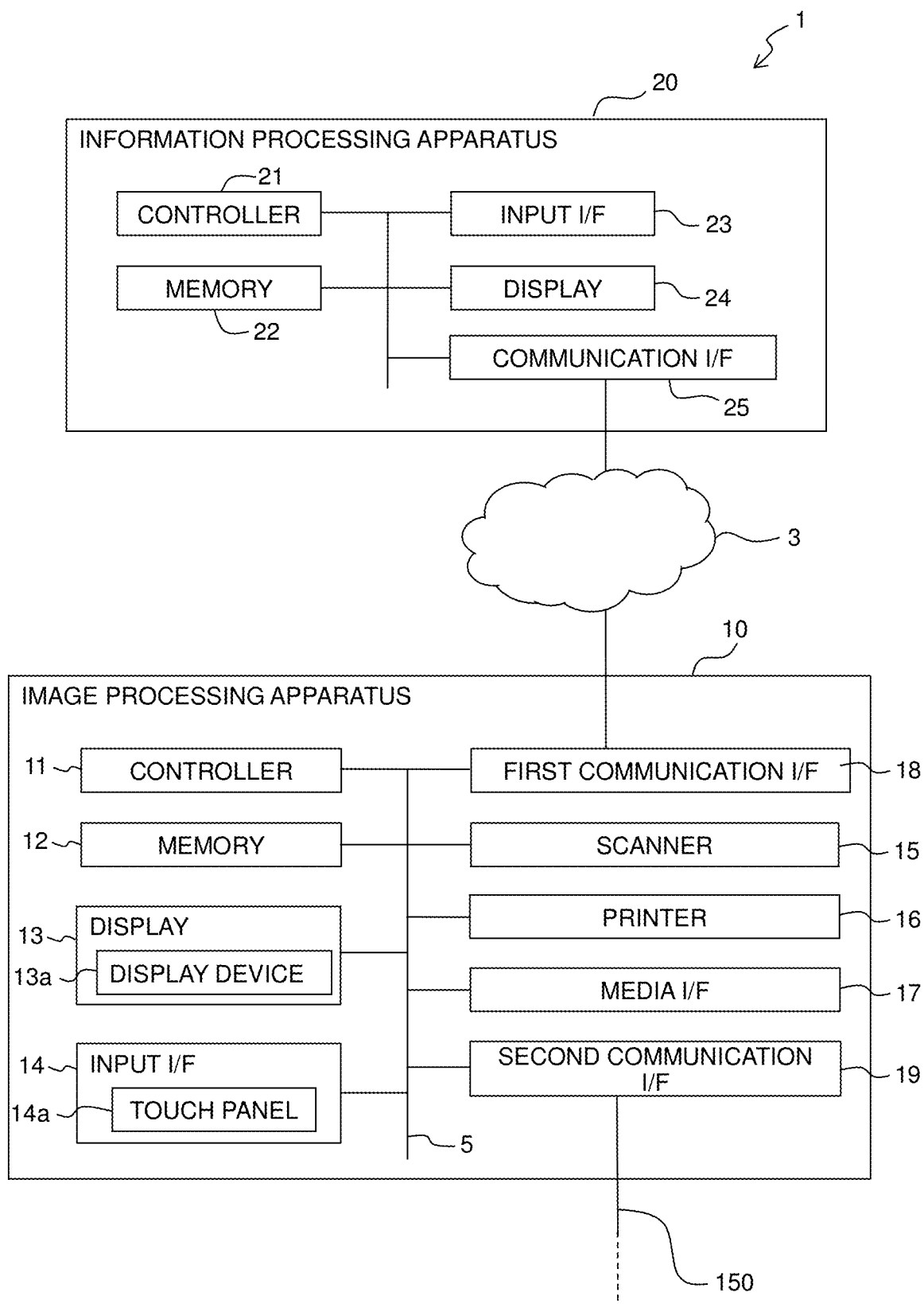
FIG. 1 is an illustration diagram depicting a schematic configuration of an information processing system.

An information processing system 1 depicted in FIG. 1 according to this embodiment includes an image processing apparatus 10 and an information processing apparatus 20. The image processing apparatus 10 and the information processing apparatus 20 are capable of mutual data communication via a network 3. The network 3 may be any kind of networks. The network 3 may be, for example, either a wired network or a wireless network. Further, for the network either wired or wireless, the communication method in particular may be of any kind.

<Configuration of the Image Processing Apparatus>

The image processing apparatus 10 includes a number of functions such as a scanning function, a printing function, a copy function, and a facsimile function. The scanning function is a function to scan an image of a document sheet and generate image data of the scanned image. The printing function is a function to print an image on recording paper. The copy function is a function to print the image scanned with the scanning function, on a recording sheet with the printing function. The facsimile function is a function to communicate facsimile data.

As depicted in FIG. 1, the image processing apparatus 10 includes a controller 11, a memory 12, a display 13, an input interface 14, a scanner 15, a printer 16, a media interface 17, a first communication interface 18, and a second communication interface 19. These units of interface are connected with each other via a bus 5. Note that the input interface 14, the media interface 17, the first communication interface 18, and the second communication interface 19 will be abbreviated below as "input I/F 14", "media I/F 17", "first communication I/F 18", and "second communication I/F 19", respectively.

The controller 11 has a CPU. The memory 12 has semiconductor memories such as, for example, a ROM, a RAM, an NVRAM, a flash memory, and the like. That is, the image processing apparatus 10 is provided with a microcomputer including a CPU and semiconductor memories.

The controller 11 realizes various functions by executing programs stored in a non-transition physical recording medium. In this embodiment, the memory 12 plays the role of the non-transition physical recording medium in which the programs are stored. Note that the various functions realized by the controller 11 are not only realized by program execution but may be realized by using one or a number of hardware devices to replace part or all of the programs.

The memory 12 stores the data of various screens including an after-mentioned home screen 40 (see FIGS. 2A and 2B and FIGS. 6A to 6C). Further, the memory 12 also stores the data of a main home screen tab setting table depicted in FIG. 3A, the data of a tab setting table depicted in FIG. 3B, the data of a user list depicted in FIG. 3C, the data of an individual main home screen tab setting table depicted in FIG. 3D, the data of a tab attribute setting screen depicted in FIG. 4, the data of a main home screen setting screen 35 depicted in FIG. 5, the programs of respective processes depicted in FIGS. 7 to 12, and the like.

The display 13 has a display device for displaying various kinds of information. The display 13 according to this embodiment has a display device 13a as the display device. The input I/F 14 has an input device for receiving various input operations. The input I/F 14 according to this embodiment has a touch panel 14a as the input device. The touch panel 14a is arranged to overlap with an image display area for image display on the display device 13a of the display 13.

The touch panel 14a can detect an instructing operation performed by an instructing body contacting with or approaching the image display area of the display 13. That is, the touch panel 14a is configured to be capable of outputting position information indicating an instructing position at which that instructing operation is performed, when the instructing body performs the instructing operation on the image display area of the display 13. The touch panel 14a of this embodiment is configured to output the position information continuously or periodically during the instructing body performing the instructing operation.

Note that the touch panel 14a may be configured to be capable of the detection only by contact as the instructing operation or be configured to be capable of the detection only by approach or be configured to be capable of the detection by either contact or approach.

The controller 11 obtains the position information outputted from the touch panel 14a and, based on the obtained position information, it is possible to detect whether or not there is an instructing operation by the instructing body, the instructing position if the instructing operation is performed, and at least one kind of specified operations by the instructing body if the instructing operation is performed.

The specified operations detectable with the controller 11 include, for example, a tap operation, a flick operation, a drag operation, and the like. The tap operation is for the instructing body to come away at the same position after the instructing operation is performed by the instructing body. It is conceivable to have the instructing body, which is capable of performing the instructing operation, in various particular forms; for example, in the form of a fingertip, in the form of a specific instructing device such as a stylus pen or the like.

The scanner 15 includes an image sensor adapted to read in images from manuscripts and generate image data for the read-in images. The printer 16 has a printing mechanism to carry out printing by ink jet technologies or electrophotographic technologies, being capable of printing an image on a sheet of the recording paper.

The media I/F 17 is an interface unit installed with various storage media such as USB flash memories and the like. The media I/F 17 controls the writing and reading of data into and out of the installed storage media.

The first communication I/F 18 is a communication interface for connecting the image processing apparatus 10 to the network 3. The image processing apparatus 10 may execute data communication via the first communication I/F 18 in a wired or wireless manner with various information processing apparatuses such as personal computers, smartphones, tablet terminals, and the like. Further, the image processing apparatus 10 may be connected to the Internet via the first communication I/F 18 to execute data communication with various other servers, the information processing apparatuses and the like via the Internet.

The second communication I/F 19 is an interface for executing communication with external devices via a communication network 150. The communication network 150 connected to the second communication I/F 19 is, for example, a public telephone network in this embodiment. Basically, transceiving facsimile data in the facsimile function is executed via the second communication I/F 19.

<Configuration of the Information Processing Apparatus>

The information processing apparatus 20 is an information processing terminal of any of the various types such as, for example, a personal computer, a tablet terminal, a smartphone, or the like. As depicted in FIG. 1, the information processing apparatus 20 includes a controller 21, a memory 22, an input interface 23, a display 24, and a communication interface 25. Note that the input interface 23 and the communication interface 25 will be abbreviated below as "input I/F 23" and "communication I/F 25", respectively.

The controller 21 has a CPU for example. The memory 22 has, for example, semiconductor memories such as a ROM, a RAM, an NVRAM, a flash memory, and the like. That is, the information processing apparatus 20 according to this embodiment is provided with a microcomputer including a CPU and semiconductor memories. The memory 22 stores data and various kinds of software.

The display 24 has a display device capable of displaying an image such as a liquid crystal display, an organic EL display, or the like. The input I/F 23 has an input device for receiving various input operations. The input device of the input I/F 23 includes, for example, a keyboard, a mouse, a touch panel, and the like. The touch panel is arranged to overlap with the image display area on the display device of the display 24.

The communication I/F 25 is a communication interface for executing communication with external devices via the network 3. The information processing apparatus 20 can execute data communication with the image processing apparatus 10 via the communication I/F 25.

<Explanation on the Home Screen>

Figure 2B:
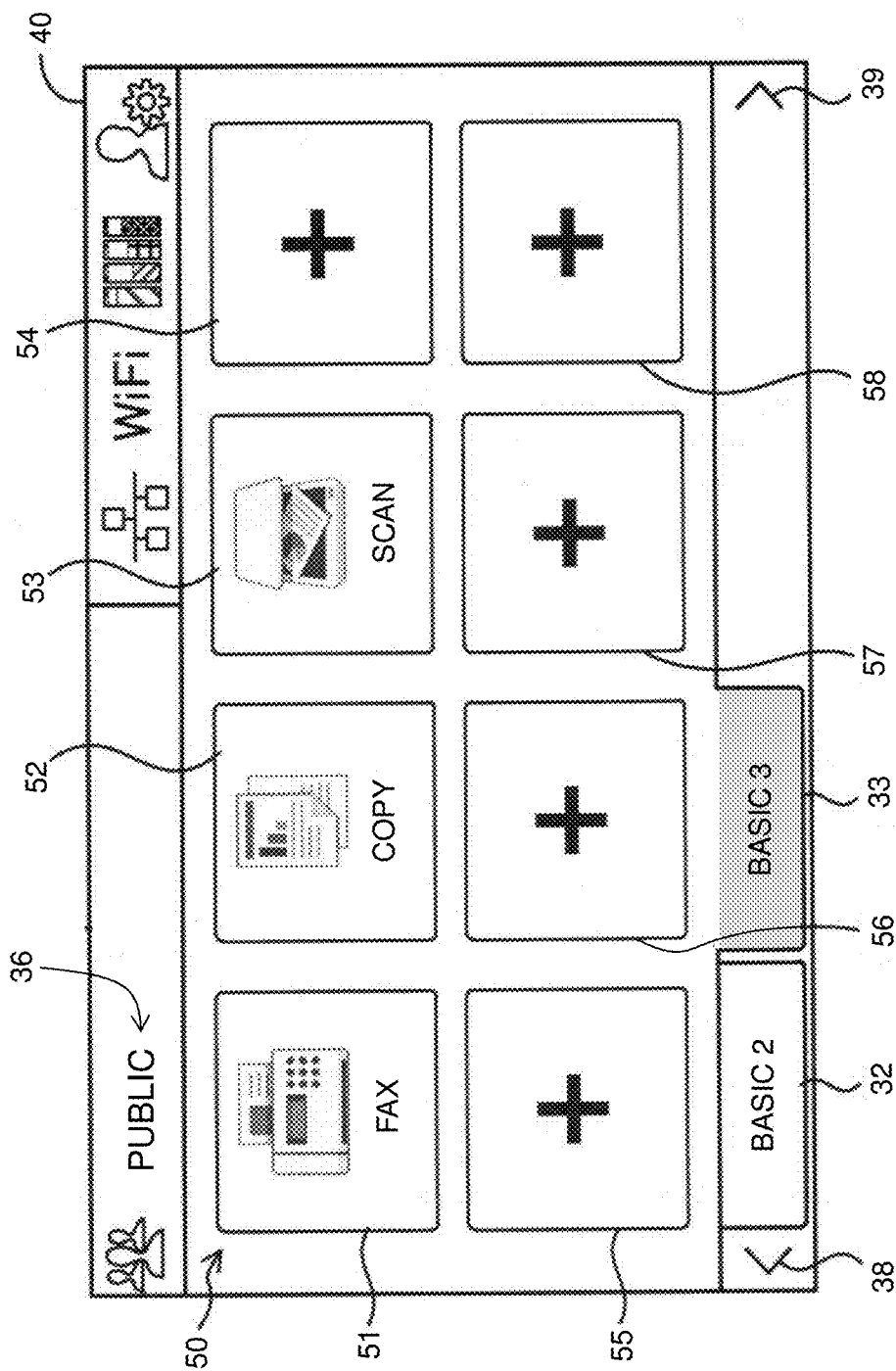

With the image processing apparatus 10, if the controller 11 is activated, then the display device 13a displays the home screen 40 as depicted in FIG. 2A or FIG. 2B, for example. The home screen 40 has a number of tabs 31, 32, . . . .

The tabs displayed on the home screen 40 may differ depending on whether an after-mentioned user authentication function is turned ON or OFF. Further, even if the user authentication function is set at ON, the tabs may still differ according to an after-mentioned user mode or login user. FIGS. 2A and 2B show an example of the home screen 40 when the user authentication function is set at ON and the user mode is set at an ordinary mode.

Each of the tabs 31, 32, . . . is associated individually with a tab screen 50. The home screen 40 displays the tab screen 50 corresponding to one tab set in a selected state among the tabs 31, 32, . . . . The selected tab is displayed in a different form from other tabs. FIG. 2A shows an example where the first tab 31 named "Basic 1" is selected and the first tab 31 is displayed in the different form from the other tabs (such as in different color, different size, etc.). FIG. 2B shows an example where the third tab 33 named "Basic 3" is selected and the third tab 33 is displayed in the different form from the other tabs.

The memory 12 stores various kinds of information needed to display the home screen 40, information about the contents of the processes to be executed when various input operations are performed on the home screen 40 via the input I/F 14, and the like.

A number of icons are arranged in the tab screen 50 associated with each tab. In this embodiment, for example, eight icons are arranged in one tab screen 50. That is, as depicted in FIG. 2A, a first icon 51 to an eighth icon 58 are arranged in the tab screen 50. It is possible to change the type of each icon.

Each icon arranged in the tab screen 50 is associated with a specific process in a specific function. The user can tap any of the icons to execute the specific process associated with that icon.

In the tab screen 50 exemplified in FIG. 2A, for example, the first icon 51 is associated with the specific process of the facsimile function. The second icon 52 is associated with the specific process of the copy function. The third icon 53 is associated with the specific process of the scanning function. The fourth icon 54 and the eighth icon 58 are unregistered icons and unassociated with any specific process. The user can register a specific process to any of those unregistered icons. Explanation is omitted for the fifth icon 55 to the seventh icon 57.

The tabs displayed on the home screen 40 are controlled in the tab setting table depicted in FIG. 3B. N tabs (N is an arbitrary nonzero natural number) are listed up in the tab setting table according to a predetermined order. The predetermined order in this embodiment is, as depicted in FIG. 3B for example, the first tab, the second tab, the third tab, . . . , the N-th tab.

An attribute is set for each tab. In this embodiment, common or personal attribute is set. It is possible to change the tab attribute arbitrarily for each tab. FIG. 3B shows an example where the first tab to the third tab are of the common attribute while the other tabs are of the personal attribute.

Further, a tab name is set for each tab. The tab name is displayed in each tab when the tab is displayed on the home screen 40. It is possible to change the tab name arbitrarily for each tab. Further, to each tab, there are set the number of associated icons or, more specifically, the number of the icons other than the unregistered icons.

The tab setting table may be prestored in the memory 12 of the image processing apparatus 10. In such a case, for the image processing apparatus 10, the user may be allowed to arbitrarily customize the tab setting table stored in the memory 12.

Further, the tab setting table may be obtained at a specific acquisition time from another device such as the information processing apparatus 20 or the like, and then be stored in the memory 12. In this embodiment, for example, in the information processing apparatus 20, the tab setting table is configured to be allowed for arbitrary customization. Then, if the controller 11 of the image processing apparatus 10 is activated, then the tab setting table is obtained via the network 3 from the information processing apparatus 20, and then stored in the memory 12. If the tab setting table is stored in the memory 12, then the controller 11 refers to the stored tab setting table and then displays the home screen 40.

Note that after being stored in the memory 12, the tab setting table already stored in the memory 12 may still be updated by a new tab setting table which is obtained from the information processing apparatus 20 at a specific time.

Each tab on the home screen 40 has the rightward direction as its arrayal direction in this embodiment. That is, each tab is arrayed in order in the rightward direction. The arrayal order of each tab along the arrayal direction is, for example, an order according to the aforementioned predetermined order, that is, an ascending order according to the predetermined order.

In this embodiment, it is possible to display four tabs, for example, at the most at the same time on the home screen 40. In this embodiment, the total number N of tabs is more than four which is the maximum number of tabs displayable on the home screen 40 at the same time (to be referred to below as "the maximum number of simultaneously displayable tabs). FIG. 2A shows an example where the first tab 31 to the third tab 33 are displayed on the home screen 40 among the N tabs from the first tab to the N-th tab.

In the vicinity of the two ends of the area displaying the tabs on the home screen 40, a left button 38 and a right button 39 are displayed, respectively. If the tabs to be displayed are five or more and four of the same are displayed, then it is possible to display the not displayed tab(s) by tapping the left button 38 or the right button 39 to left-scroll or right-scroll the tabs to be displayed.

If the user desires to switch the tab screen with the currently selected tab to the tab screen with another tab for example, then he or she only needs to tap the tab of the switch-to tab screen. If a tab other than the currently selected tabs is tapped, then that tapped tab is selected, and the tab screen corresponding to that newly selected tab is displayed on the home screen 40.

The image processing apparatus 10 is provided with the user authentication function which is set to ON or OFF. Setting the user authentication function to ON or OFF may be performed by the image processing apparatus 10 or be performed via the network 3 by an external device such as the information processing apparatus 20 or the like.

As depicted in FIGS. 2A and 2B, if the user authentication function is set at ON, then the user authentication function is enabled, and the user mode of the image processing apparatus 10 is set to the ordinary mode or an individual mode. The ordinary mode is a user mode in which any registered user has not logged in. That is, it is possible for all users to set the ordinary mode without needing an authentication process such as inputting a password or the like. On the other hand, the individual mode is to be set by any preregistered user (to be referred to below as "registered user") who performs a predetermined user authentication operation to log in. That is, with any registered user logging in, the individual mode is set in accordance with that registered user.

In this embodiment, it is possible to register a user on the user list in the image processing apparatus 10 directly or indirectly via an external device such as the information processing apparatus 20 or the like. For example, the user list depicted in FIG. 3C is under the management of the information processing apparatus 20. The registered users are registered on the user list. Further, it is possible to register an individual registration tab in the user list for each registered user. If the information processing apparatus 20 executes a registration process for a registered user, then that registered user is added to the user list. Further, it is possible to arbitrarily register an individual registration tab for that registered user.

The user list depicted in FIG. 3C exemplifies that at least the users A, B, C, and D are registered as the registered users. Further, there is depicted an example where the fourth tab is registered as the individual registration tab of the user A, the fifth tab is registered as the individual registration tab of the user B, the second tab is registered as the individual registration tab of the user C, and no tab is registered as the individual registration tab of the user D. It is also possible to register a tab of either the common or personal attribute for the individual registration tab. In this embodiment, however, as one example, it is possible for one registered user to register only one tab such that it is not possible for a number of users to set the same one tab to the individual registration tab repetitively.

The user list may be managed by the image processing apparatus 10 per se as well but, basically, is to be managed by the information processing apparatus 20 and the image processing apparatus 10 may obtain the same from the information processing apparatus 20 as necessary. In this embodiment, each time a registered user logs in, the image processing apparatus 10 carries out a data communication with the information processing apparatus 20 to refer to the user list managed in the information processing apparatus 20 for obtaining the information indicating the individual registration tab corresponding to the registered user who has logged in.

The login of a registered user is performed by executing the predetermined authentication process. In the predetermined authentication process, for example, the registered user-specific authentication information (the password, for example) is inputted via the input I/F 14.

Depending on whether the user mode is the ordinary mode or the individual mode, the tabs displayed on the home screen 40 differ. Further, in the individual mode, too, depending on which registered user has logged in, the tabs displayed on the home screen 40 differ.

If the user authentication function is set to ON, then as depicted in FIGS. 2A and 2B, a user switching interface 36 is displayed on the home screen 40. The user switching interface 36 is an image for the user's operation (for example, a tap operation) in order to switch the user mode.

Figure 6A:
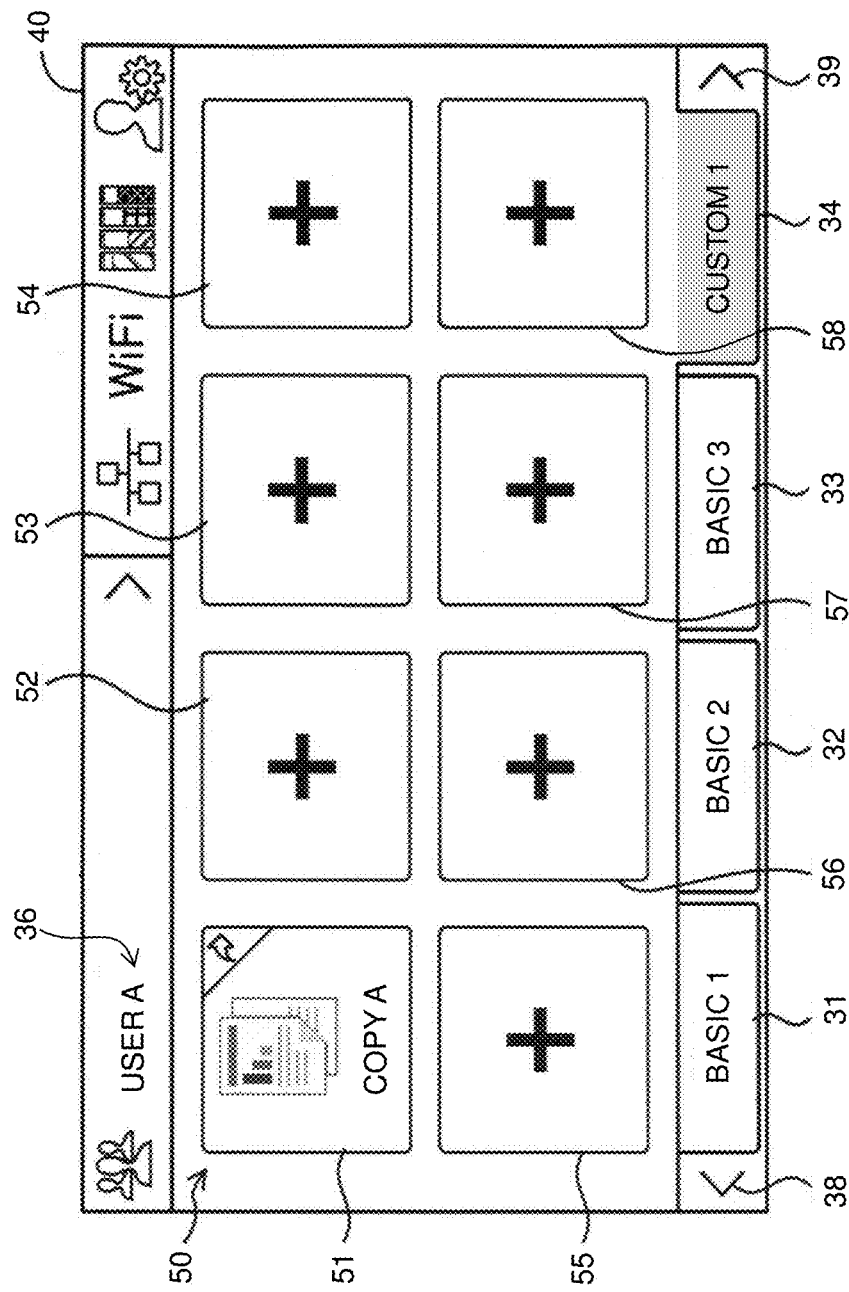
Figure 6B:
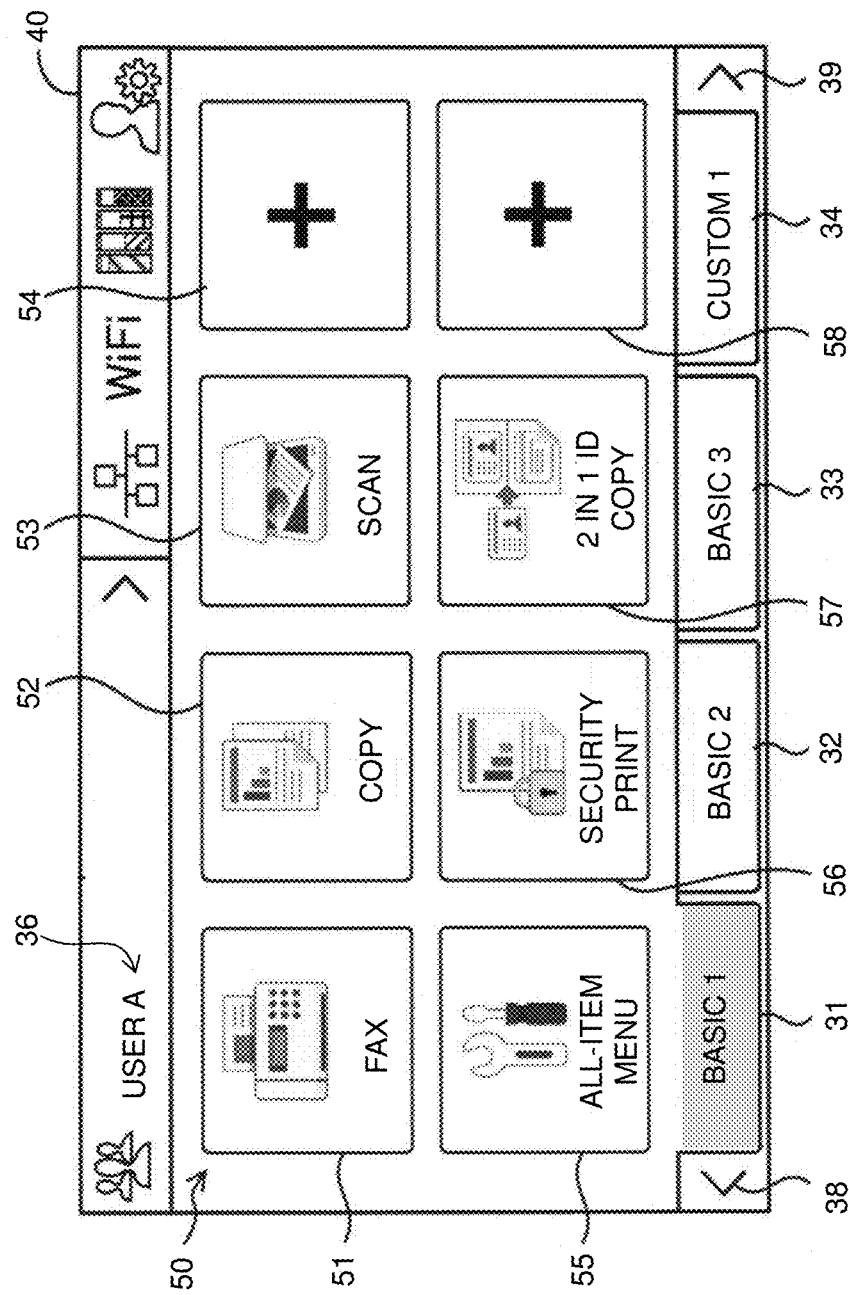
Figure 6C:
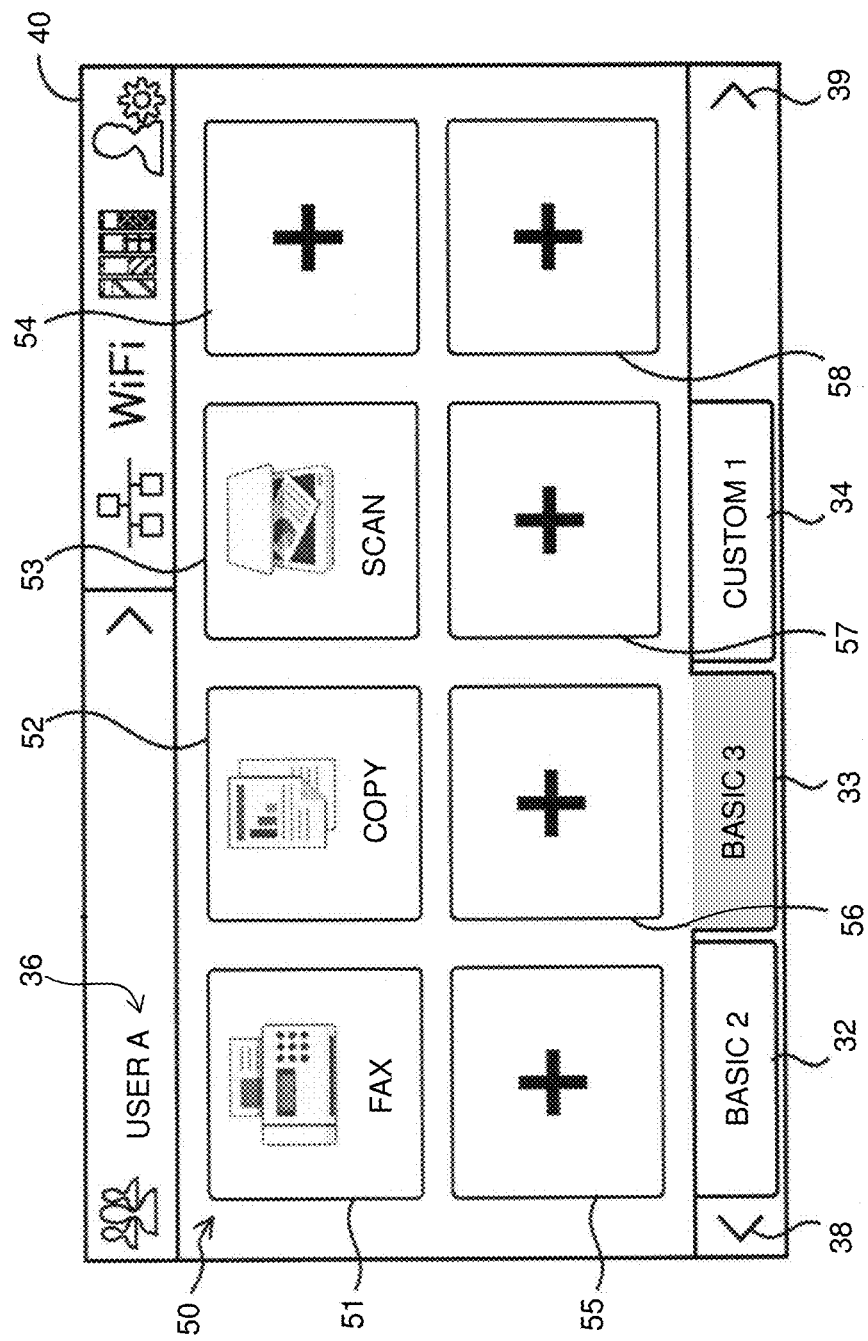

In the user switching interface 36, information is displayed to show the current user mode. In this embodiment, if the user mode is set at the ordinary mode, then as depicted in FIGS. 2A and 2B, the word "Public" is displayed to indicate the ordinary mode. If the user mode is set at the individual mode, then as depicted in FIGS. 6A to 6C, information is displayed to show the login user in the user switching interface 36.

If the user switching interface 36 is tapped, then the display 13 displays an undepicted user mode selection screen for selecting the user mode. On the user mode selection screen, the ordinary mode and each registered user are displayed as the options. Then, if the ordinary mode is selected, then the user mode is set to the ordinary mode.

In the ordinary mode, on the home screen 40, the tabs of the common attribute are displayed and one of those tabs is set to the selected state. In the ordinary mode, basically, no tabs of the personal attribute are displayed.

Note that if the user authentication function is set at ON, then when the controller 11 is powered and activated (to be referred to below as "first timing), the controller 11 sets the user mode to the ordinary mode for example, and displays the home screen 40 corresponding to the ordinary mode. Further, in the ordinary mode, if a screen different from the home screen 40 is displayed, then when an undepicted home key included in the input I/F 14 is tapped (to be referred to below as "second timing"), the controller 11 also displays the home screen 40 corresponding to the ordinary mode. Further, if the user mode is changed from the individual mode to the ordinary mode (to be referred to below as "third timing"), the controller 11 still displays the home screen 40 corresponding to the ordinary mode.

The main home screen tab, which is first set to the selected state on the home screen 40 displayed at the first timing to the third timing, is set in the main home screen tab setting table depicted in FIG. 3A. The user can perform a specific setting operation to change the main home screen tab. FIG. 3A shows an example where the main home screen tab is set at the first tab. At the first timing to the third timing, the controller 11 refers to the main home screen tab setting table to obtain the setting value of the main home screen tab. Then, the tab indicated by the obtained setting value is displayed on the home screen 40 as in the selected state.

In this embodiment, as depicted in FIG. 3B, the first tab to the third tab are of the common attribute. Therefore, on the home screen 40 in the ordinary mode, as exemplified in FIG. 2A, the first tab 31, the second tab 32 and the third tab 33 are displayed. Further, based on the setting value of the main home screen tab setting table depicted in FIG. 3A, the first tab 31 is selected, and the tab screen 50 for the first tab 31 is displayed.

The user can arbitrarily change the attribute and the name of each tab in the tab setting table. Therefore, such a case as follows may occur. That is, suppose that a certain user has set the first tab of the common attribute to the main home screen tab based on the setting value of the tab setting table depicted in FIG. 3B (corresponding to the state of FIG. 3A). At this point of time, at the first timing to the third timing, on the displayed home screen 40, as depicted in FIG. 2A, the first tab 31 to the third tab 33 of the common attribute are displayed while the first tab 31 set at the main home screen tab is set to the selected state.

Then, suppose that the first tab 31 is changed to the personal attribute. On this occasion, the first tab 31 is no longer displayed on the home screen 40 in the ordinary mode. On the other hand, the setting value for the main home screen tab is set to the first tab. Therefore, all tabs which ought to be in the selected state are not present in the home screen 40.

In this embodiment, therefore, in order to appropriately deal with the above case, if the tab set at the main home screen tab is changed to the personal attribute, then one of the tabs of the common attribute other than that tab is to be set to the selected state.

In the example of FIG. 3B, if the first tab is changed to the personal attribute, then there are two tabs of the common attribute: the second tab and the third tab. Any one of the two tabs may be set to the selected state but, in this embodiment, the tab at the upper position is selected according to the aforementioned predetermined order. Therefore, basically, the second tab is selected.

In this embodiment, however, the tabs without registered icons have a lower priority for the selected state than the tabs with registered icons. As depicted in FIG. 3B, if the numbers of icons of the second tab and the third tab are compared, then the second tab has no registered icon whereas the third tab has three registered icons.

Therefore, in this embodiment, considering the predetermined order, the second tab is arranged at the upper position over the third tab; however, the standard for determining whether or not icons are registered takes a priority. As a result, displayed on the home screen 40 as exemplified in FIG. 2B, the second tab 32 without registered icon is not in the selected state but the third tab 33 with the registered icons is in the selected state.

Next, using FIGS. 4 and 5, an explanation will be made on a method for changing the tab attribute and a method for changing the setting of the main home screen tab. The tab attribute can be changed via the tab attribute setting screen 30 depicted in FIG. 4, either at the image processing apparatus 10 or by remote control from the information processing apparatus 20. The tab attribute setting screen 30 includes attribute setting images 71 to 78 according to each tab. The user can change the tab attribute via the attribute setting image corresponding to the tab whose attribute is to be changed among the attribute setting images 71 to 78.

Further, on the tab attribute setting screen 30, as depicted in FIG. 4, in the vicinity of the attribute setting image of the tab set at the main home screen tab (at the right side, for example), a main home setting mark 7 is added. Based on the main home setting mark 7, the user can know which tab is set at the main home screen tab. Therefore, it is possible to prevent the tab set at the main home screen tab from being changed to the personal attribute.

The setting value for the main home screen tab depicted in FIG. 3A can be set via a main home screen setting screen 35 of FIG. 5 displayed in the image processing apparatus 10. The main home screen setting screen 35 displays the option for each tab set in the tab setting table, that is, tab selection buttons 35a, 35b, . . . . The user can select any tab selection button to set the tab corresponding to that tab selection button to the main home screen tab.

However, on the main home screen setting screen 35, the tab selection buttons 35a, 35b, and 35c are effective as the options corresponding to the tabs of the common attribute, whereas the other tab selection buttons 35d, 35e, . . . are ineffective as the options corresponding to the tabs of the personal attribute. The tab selection buttons ineffective as the options are displayed in a different fashion (such as different color) from those tab selection buttons effective as the options. Even if the user performs a tap operation or the like, the operation will be ineffective.

On the other hand, if a tap operation is performed, for example, on any of the tab selection buttons 35a, 35b, and 35c effective as the options, then the tab corresponding to the tapped tab selection button is set to the main home screen tab. Then, according to the setting contents, the setting value of the main home screen tab setting table of FIG. 3A is updated.

On the aforementioned user mode selection screen (not depicted) displayed by tapping the user switching interface 36, if any registered user is selected, then an undepicted authentication screen is displayed for carrying out the authentication process. Via this authentication screen, if legitimate user authentication information corresponding to the selected registered user is inputted, then the authentication i.e. the login is successful, and the user mode is set to the individual mode for the selected registered user.

In the individual mode, from the user list (see FIG. 3C), an individual registration tab registered for the corresponding registered user is obtained, and that individual registration tab is displayed on the home screen 40. Further, in the individual mode, the tabs of the common attribute are also displayed on the home screen 40. In the individual mode, the tabs of the personal attribute are not displayed on the home screen 40 except the individual registration tab of the corresponding registered user.

In this embodiment, in the individual mode, to set which tab to the selected state is different with the setting value of the individual main home screen tab setting table of the individual registration tabs depicted in FIG. 3D (to be abbreviated below as "individual tab home setting table").

If the setting value of the individual tab home setting table is OFF, then one of the common attribute tabs to be displayed is set to the selected state (the upmost tab in the predetermined order, for example). On the other hand, if the setting value of the individual tab home setting table is ON, then the individual registration tab corresponding to the login user is set to the selected state.

For example, the user A is on the user list where the fourth tab is registered as the individual registration tab. Therefore, if the user A has logged in, and the setting value of the individual tab home setting table is set at ON for example, then on the home screen 40, as depicted in FIG. 6A, the fourth tab 34 being the individual registration tab of the user A and the first tab 31 to the third tab 33 of the common attribute are displayed. Then, the fourth tab 34 is in the selected state.

Further, from the state depicted in FIG. 6A, for example, if the setting value of the individual tab home setting table is changed to OFF, then as exemplified in FIG. 6B, the first tab 31 is set to the selected state. Further, from the state depicted in FIG. 6B, for example, if the first tab 31 is changed to the personal attribute, then as depicted in FIG. 6C, the first tab 31 is deleted. Then, among the other tabs of the common attribute, the third tab 33 is set to the selected state, the third tab 33 being the upmost tab in the predetermined order and having the registered icons.

<Ordinary Mode Home Screen Display Process>

Figure 7A:
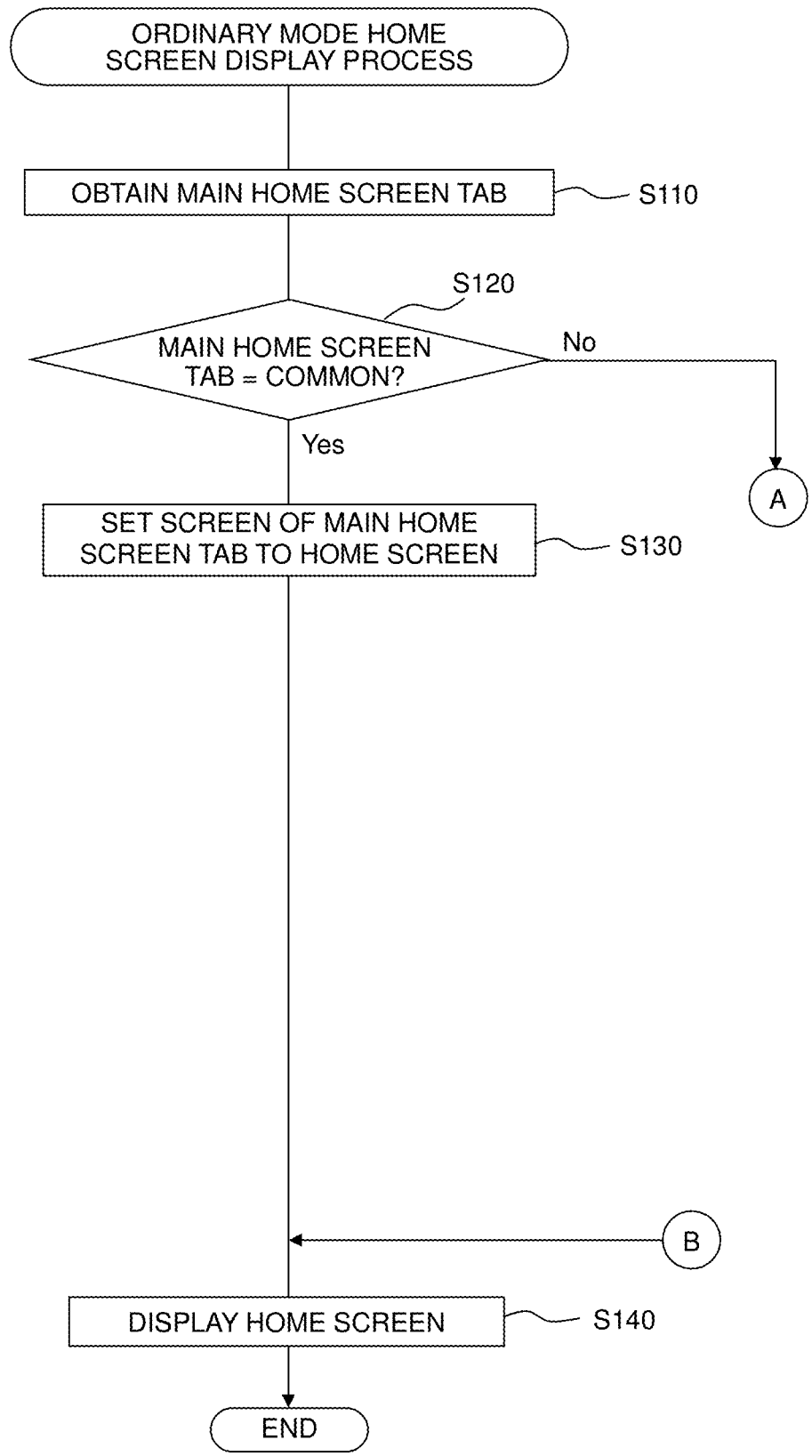
FIGS. 7A and 7B depict a flow chart of an ordinary mode home screen display process.
Figure 7B:
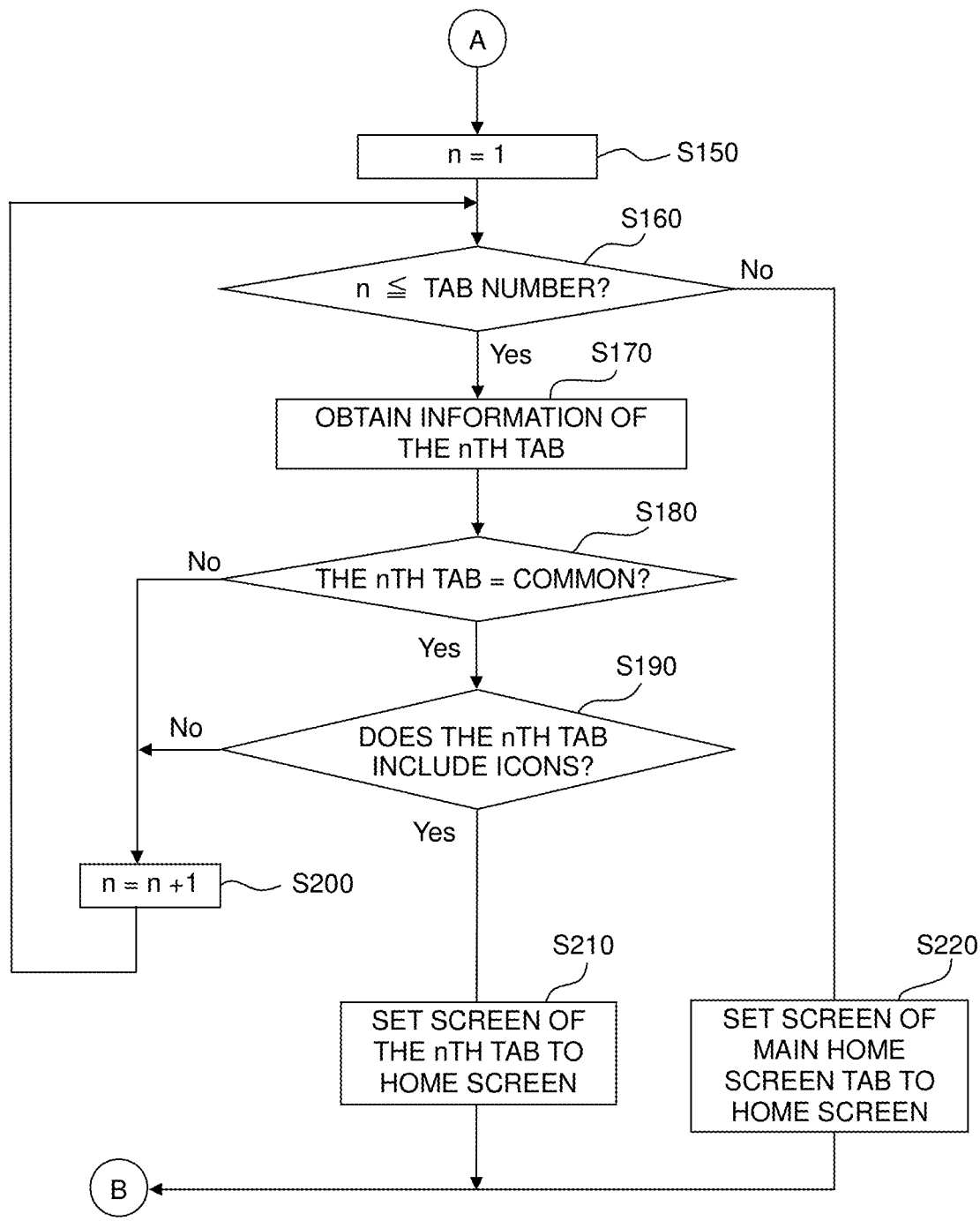

Next, referring to FIGS. 7A and 7B, an explanation will be made on an ordinary mode home screen display process executed in the ordinary mode for displaying the home screen 40. At any of the aforementioned first timing to third timing comes, the controller 11 reads in the program from the memory 12 and executes the same for the ordinary mode home screen display process.

If the ordinary mode home screen display process is started, then the controller 11 obtains the setting value of the main home screen tab from the main home screen tab setting table (see FIG. 3A) in the step S110. Further, referring to the tab setting table (see FIG. 3B), the controller 11 obtains the tab attribute, the tab name and the number of icons of each tab registered in the tab setting table. Note that the controller 11 may obtain information of the tab setting table from another device such as the information processing apparatus 20 or the like, and obtain the tab attribute from the tab setting table while storing the tab setting table into the memory 12. Alternatively, the controller 11 may read out the latest tab setting table obtained in the process of S110 and stored in the memory 12, and obtain the tab attribute, the tab name and the number of icons of each tab from the tab setting table.

In the step S120, the controller 11 determines whether or not the main home screen tab obtained in the step S110 is of the common attribute. That is, the controller 11 obtains the tab attribute matching the index in the obtained tab setting table from the setting value of the obtained main home screen tab, and then determines whether or not it is the common attribute. If the main home screen tab is of the common attribute, then the process proceeds to the step S130. In S130, the controller 11 sets the tab screen of the main home screen tab to the home screen. That is, the controller 11 sets the tab screen of the main home screen tab as the screen to be displayed on the home screen in the selected state. In the step S140, according to the contents set in S130, the home screen 40 is displayed. That is, referring to the tab setting table, the tab set to the home screen in the step S130 is set to the selected state on the home screen 40 including the tabs of the common attribute.

In the step S120, if the main home screen tab is not of the common attribute, then the process proceeds to the step S150. In S150, the variable n is set to one. In the step S160, the controller 11 determines whether or not the variable n is equal to or less than the total number of tabs. If the variable n is equal to or less than the total number of tabs, then the process proceeds to the step S170. In S170, the controller 11 obtains information of the nth tab from the tab setting table.

In the step S180, based on the information obtained in the step S170, the controller 11 determines whether or not the nth tab is of the common attribute. If the nth tab is not of the common attribute, then in the step S200, the variable n is incremented by one, and then the process proceeds to the step S160. If the nth tab is of the common attribute, then the process proceeds to the step S190.

In the step S190, based on the information obtained in the step S170, the controller 11 determines whether or not the nth tab includes icons. If the nth tab does not include icons, then the process proceeds to the step S120. If the nth tab includes icons, then the process proceeds to the step S210. In S210, the tab screen of the nth tab is set to the home screen. After the step S210, the process proceeds to the step S140, and the home screen 40 is displayed according to the contents set in the step S210.

In the step S160, if the variable n exceeds the total number of tabs, then the process proceeds to the step S220. In S220, in the same manner as in the step S130, the tab screen of the main home screen tab is set to the home screen. After the step S220, the process proceeds to the step S140, and the home screen 40 is displayed according to the contents set in the step S220.

<Tab Attribute Setting Process>

Figure 8:
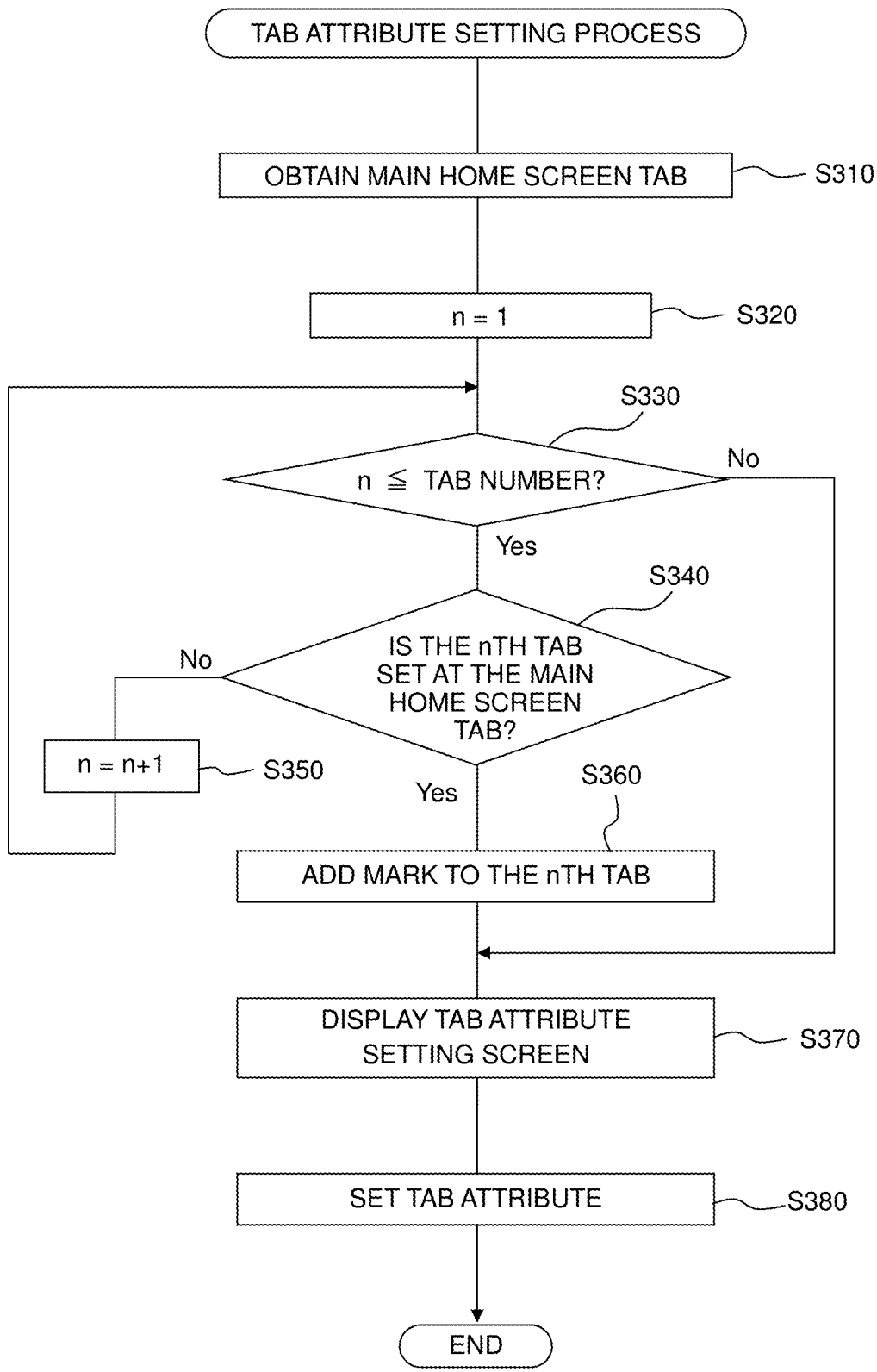
FIG. 8 is a flow chart depicting a tab attribute setting process.

Next, referring to FIG. 8, an explanation will be made on a tab attribute setting process for setting the tab attribute via the tab attribute setting screen 30 depicted in FIG. 4. If a request is inputted for setting a specific tab attribute, then the controller 11 of the image processing apparatus 10 reads in the program from the memory 12 and executes the same for the tab attribute setting process of FIG. 8. Note that the controller 21 of the information processing apparatus 20 may execute the tab attribute setting process and send the process result to the image processing apparatus 10 at a particular time.

If the tab attribute setting process is started, then in the step S310, the controller 11 or the controller 21 obtains the setting value of the main home screen tab from the main home screen tab setting table (see FIG. 3A).

In the step S320, the variable n is set to one. In the step S330, the controller 11 or 12 determines whether or not the variable n is equal to or less than the total number of tabs. If the variable n exceeds the total number of tabs, then the process proceeds to the step S370. If the variable n is equal to or less than the total number of tabs, then the process proceeds to the step S340.

In the step S340, the controller 11 or 12 refers to the main home screen tab setting table (see FIG. 3A), and determines whether or not the nth tab is set at the main home screen tab. If the nth tab is not set at the main home screen tab, then in the step S350, the variable n is incremented by one, and the process returns to the step S330.

If the nth tab is set at the main home screen tab, then the process proceeds to the step S360. In S360, the main home setting mark 7 (see FIG. 4) is set to be added to the nth tab. In the step S370, the tab attribute setting screen 30 (see FIG. 4) is displayed. On this occasion, the main home setting mark 7 is displayed in the vicinity of the attribute setting image of the tab set in the step S360 to add the main home setting mark 7. In the step S380, the user's input is received at the tab attribute setting screen 30 displayed in the step S370 and, based on the input, the attribute of each tab is set.

<Main Home Screen Setting Process>

Figure 9:
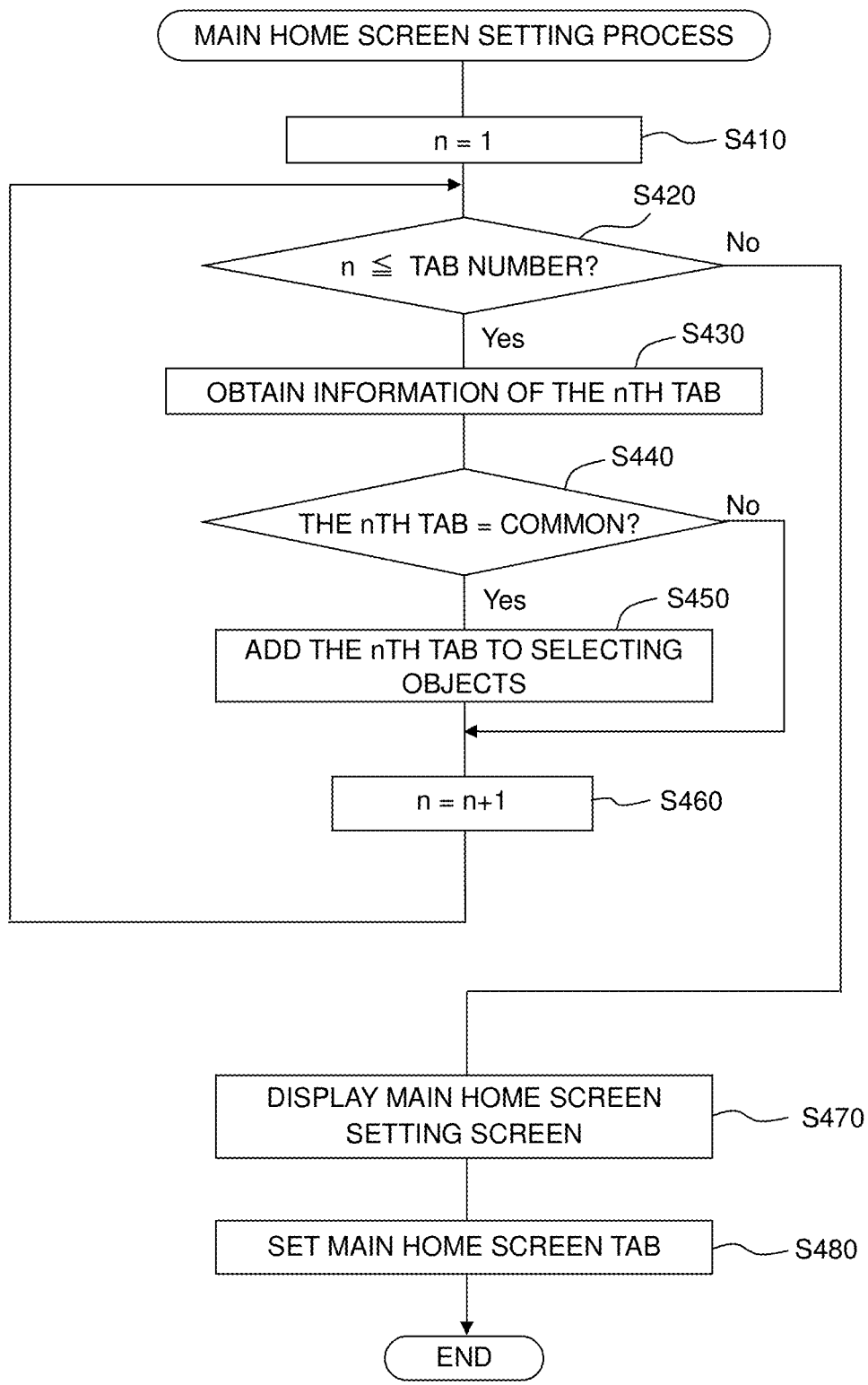
FIG. 9 is a flow chart depicting a main home screen setting process.

Next, referring to FIG. 9, an explanation will be made on a main home screen setting process for setting the main home screen tab (see FIG. 3A) via the main home screen setting screen 35 depicted in FIG. 5. If a request is inputted for setting a specific main home screen, then the controller 11 of the image processing apparatus 10 reads in the program from the memory 12 and executes the same for the main home screen setting process.

If the main home screen setting process is started, then the controller 11 sets the variable n to one in the step S410. In the step S420, the controller 11 determines whether or not the variable n is equal to or less than the total number of tabs. If the variable n is equal to or less than the total number of tabs, then the process proceeds to the step S430. In S430, the controller 11 obtains information of the nth tab from the tab setting table.

In the step S440, based on the information obtained in the step S430, the controller 11 determines whether or not the nth tab is of the common attribute. If the nth tab is not of the common attribute, then the variable n is incremented by one in the step S460 and then the process returns to the step S420. If the nth tab is of the common attribute, then the process proceeds to the step S450 to add the nth tab to selecting targets, and the process proceeds to the step S460.

In the step S420, if the variable n exceeds the total number of tabs, then the process proceeds to the step S470. In S470, the main home screen setting screen 35 (see FIG. 5) is displayed. On this occasion, as exemplified in FIG. 5, only such options are selectable as to correspond to the tabs added in the step S450 to the selecting targets (that is, the tabs of the common attribute), whereas such options are not selectable as to correspond to the tabs not added in the step S450 to the selecting targets (that is, the tabs of the personal attribute).

In the step S480, the user's input is received at the main home screen setting screen 35 displayed in the step S470 and, based on the input, the main home screen tab is set.

<Main Home Screen Initialization Process>

Figure 10A:
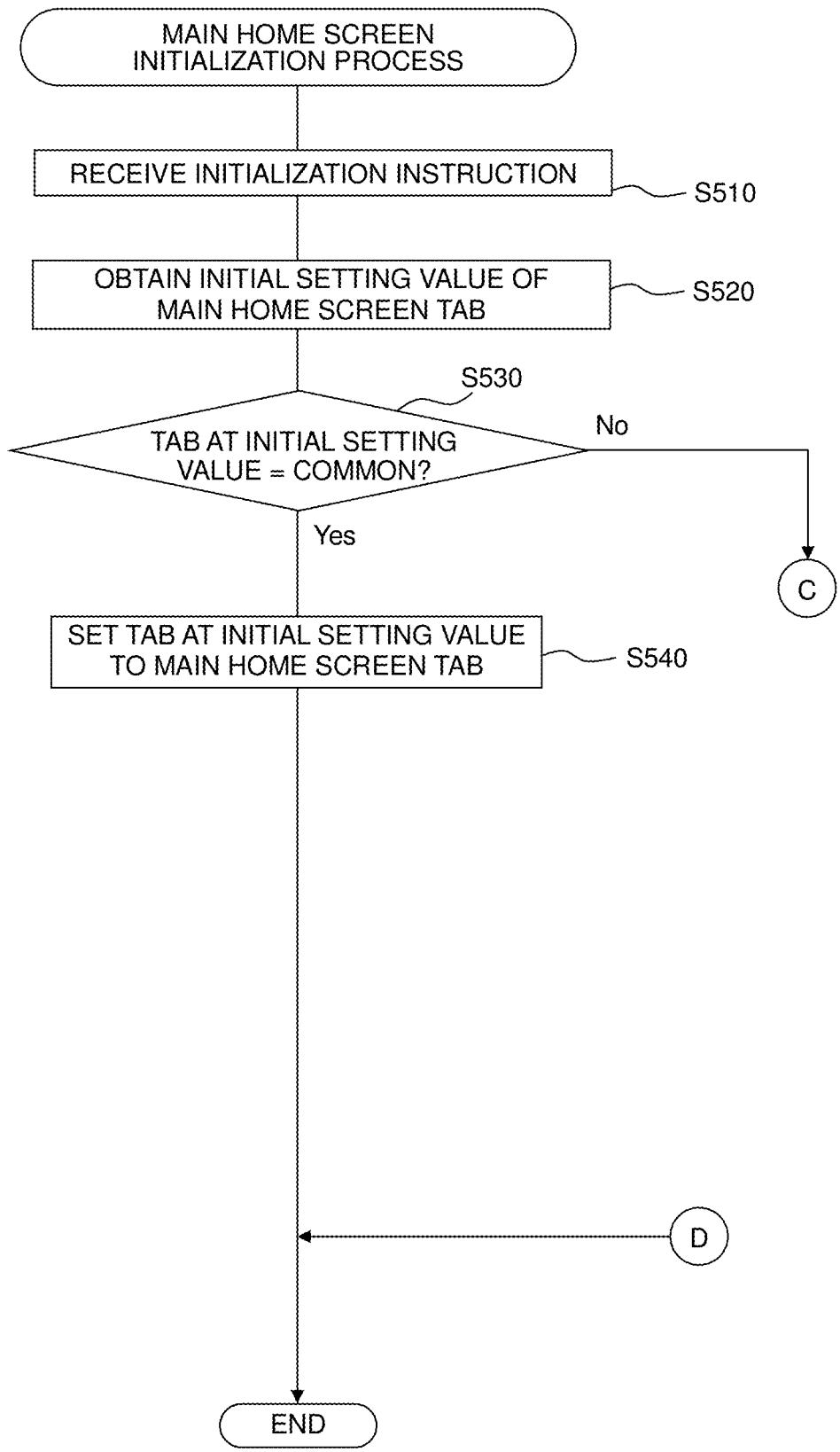
FIGS. 10A and 10B depict a flow chart of a main home screen initialization process.
Figure 10B:
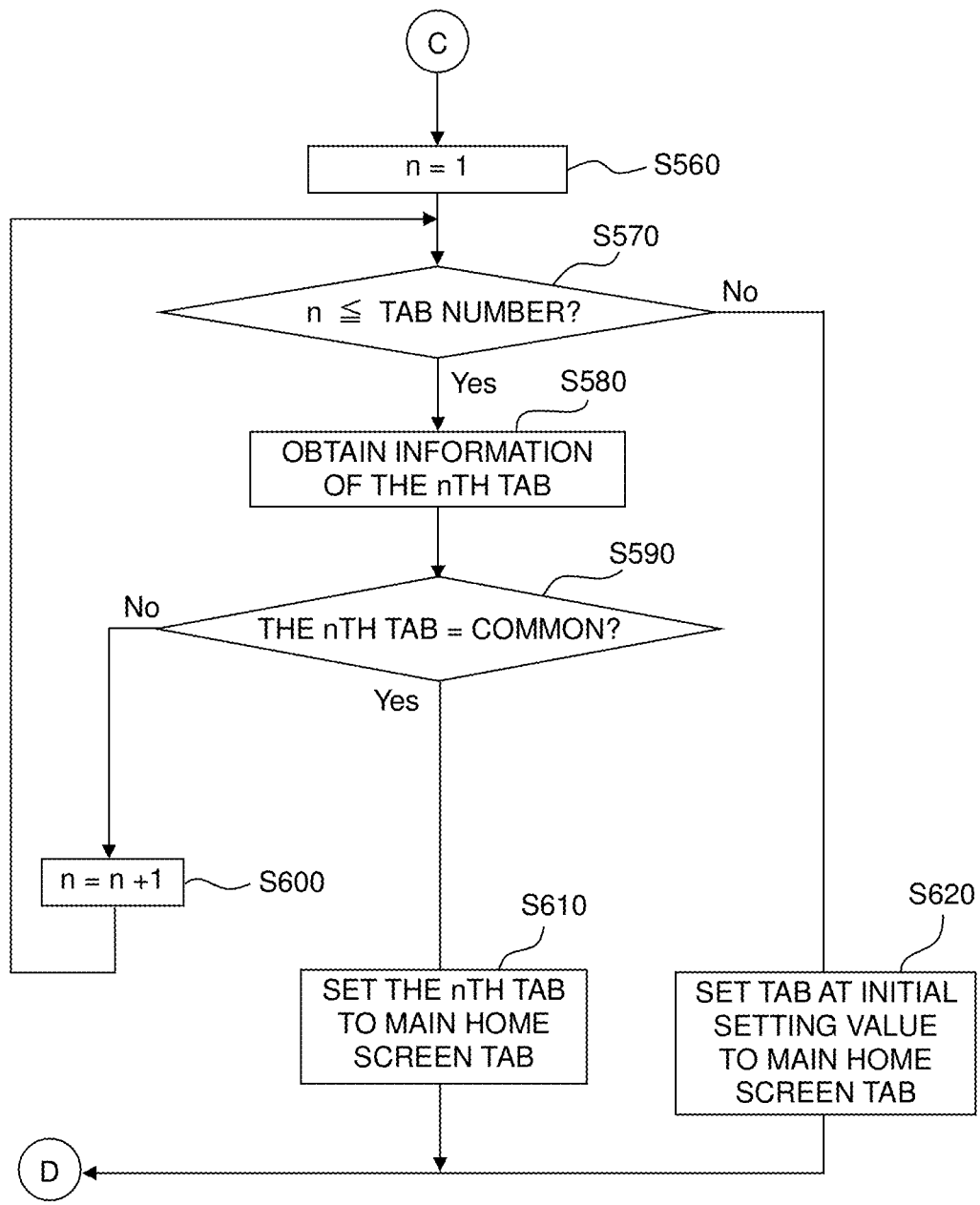

Next, referring to FIGS. 10A and 10B, an explanation will be made on the main home screen initialization process for initializing the setting value of the main home screen tab (see FIG. 3A). If a specific initialization instruction is inputted, then the controller 11 reads in the program from the memory 12 and executes the same for the main home screen initialization process of FIGS. 10A and 10B.

If the main home screen initialization process is started, then the controller 11 receives the initialization instruction operation in the step S510. In the step S520, the controller 11 obtains the initial setting value of the main home screen tab. The initial setting value of the main home screen tab may be obtained from anywhere. For example, it may be prestored in the memory 12 and then obtained from the memory 12. Alternatively, for example, it may be obtained from an external device such as the information processing apparatus 20 or the like.

In the step S530, the controller 11 determines whether or not the tab at the initial setting value obtained in the step S520 is of the common attribute. In particular, the controller 11 obtains the tab attribute corresponding to the tab at the initial setting value from the tab setting table stored in the memory 12, and determines whether or not the tab is of the common attribute. If the tab at the initial setting value is of the common attribute, then the process proceeds to the step S540. In S540, the controller 11 sets the tab screen of the tab at the initial setting value to the home screen. That is, the controller 11 sets the tab screen of the tab at the initial as the screen displayed in the selected state on the home screen.

In the step S530, if the tab at the initial setting value is not of the common attribute, then the process proceeds to the step S560. In S560, the variable n is set to one. In the step S570, the controller 11 determines whether or not the variable n is equal to or less than the total number of tabs. If the variable n is equal to or less than the total number of tabs, then the process proceeds to the step S580. In S580, the controller 11 obtains information of the nth tab from the tab setting table.

In the step S590, based on the information obtained in the step S580, the controller 11 determines whether or not the nth tab is of the common attribute. If the nth tab is not of the common attribute, then the variable n is incremented by one in the step S600, and the process returns to the step S570. If the nth tab is of the common attribute, then the process proceeds to the step S610. In S610, the nth tab is set to the main home screen tab and the main home screen tab setting table is updated to the setting value.

In the step S570, if the variable n exceeds the total number of tabs, then the process proceeds to the step S620. In S620, the tab at the initial setting value is set to the main home screen tab and the main home screen tab setting table is updated to the setting value.

<Individual Mode Home Screen Display Process>

Next, referring to FIGS. 11A and 11B, an explanation will be made on an individual mode home screen display process to be executed in the individual mode for displaying the home screen 40. If the user mode is changed from the ordinary mode to the individual mode and if the login user is changed in the individual mode, then the controller 11 reads in the program from the memory 12 and executes the same for the individual mode home screen display process.

If the individual mode home screen display process is started, then the controller 11 obtains the login user's information in the step S710. In particular, from the user list (see FIG. 3C), the controller 11 obtains the information corresponding to the registered user having newly logged in.

In the step S720, the controller 11 determines whether or not the individual registration tab is set for the registered user having logged in. If the individual registration tab is set for the registered user having logged in, then the process proceeds to the step S730. In S730, the controller 11 determines whether or not the individual registration tab set for the registered user having logged in is set for the use as an individual main home screen tab. In particular, the controller 11 determines whether the setting value of the individual tab home setting table (see FIG. 3D) is ON or OFF. If the setting value of the individual tab home setting table is OFF, then the process proceeds to the step S760. If the setting value of the individual tab home setting table is ON, then the process proceeds to the step S740.

In the step S740, the tab screen of the individual registration tab is set to the home screen. That is, the tab screen of the individual registration tab is set as the screen displayed in the selected state on the home screen. In the step S750, based on the contents set in the step S740, the home screen 40 is displayed. That is, the controller 11 refers to the tab setting table and sets the tab set to the home screen in the step S740 to the selected state, on the home screen 40 including the common attribute tabs and the individual registration tab of the login user.

In the step S720, if the individual registration tab is not set for the registered user having logged in, then the process proceeds to the step S760. In S760, the controller 11 obtains the setting value of the main home screen tab from the main home screen tab setting table (see FIG. 3A).

In the step S770, the controller 11 determines whether or not the main home screen tab obtained in the step S760 is of the common attribute. In particular, the controller 11 obtains the attribute of the tab corresponding to the setting value of the obtained main home screen tab from the tab setting table stored in the memory 12, and determines whether or not the attribute is common. If the main home screen tab is of the common attribute, then the process proceeds to the step S840. In S840, the controller 11 sets the tab screen of the main home screen tab to the home screen. On this occasion, in the step S750, based on the contents set in the step S840, the home screen 40 is displayed. That is, the controller 11 refers to the tab setting table and sets the tab set to the home screen in the step S840 to the selected state, on the home screen 40 including the common attribute tabs and the individual registration tab of the login user.

In the step S770, if the main home screen tab is not of the common attribute, then the process proceeds to the step S780. In S780, the variable n is set to one. In the step S790, the controller 11 determines whether or not the variable n is equal to or less than the total number of tabs. If the variable n is equal to or less than the total number of tabs, then the process proceeds to the step S800. In S800, the controller 11 obtains information of the nth tab from the tab setting table.

In the step S810, based on the information obtained in the step S800, the controller 11 determines whether or not the nth tab is of the common attribute. If the nth tab is not of the common attribute, then in the step S820, the variable n is incremented by one, and then the process returns to the step S790. If the nth tab is of the common attribute, then the process proceeds to the step S830.

In the step S830, the tab screen of the nth tab is set to the home screen. After the step S830, the process proceeds to the step S750, and the home screen 40 is displayed according to the contents set in the step S830. In the step S790, if the variable n exceeds the total number of tabs, then the process proceeds to the step S840.

<Effects of the Embodiment>

In the image processing apparatus 10 of this embodiment, if the user mode is set at the ordinary mode, then the personal attribute tabs are not displayed whereas the common attribute tabs are displayed, among which the tab set to the main tab is in the selected state. However, if the main tab is set at the personal attribute, then that main tab is not displayed but any other common attribute tab is in the selected state.

Therefore, even if the main tab is changed to the personal attribute, after the operation is started in the ordinary mode, it is still possible to appropriately determine the selected tab and display the home screen appropriately.

Note that in this embodiment, the memory 12 is an example of the first memory and the second memory. The home screen 40 is an example of the standby screen. Each of the icons 51 to 58 is an example of the functional object. The main home screen tab is an example of the main tab. The main home screen setting screen 35 is an example of the main tab selection screen. The main home setting mark 7 is an example of the specific mark. The attribute setting images 71 to 78 are an example of the selection image. The table of FIG. 3D is an example of the individual mode information. The setting value of the individual main home screen tab on the user list of FIG. 3C is an example of the selection designation information.

Further, the processes of the steps S140, S210, S750 and S940 are an example of the display process, wherein specifically the processes of the steps S140 and S210 are an example of the first display process, whereas the processes of the steps S750 and S940 are an example of the second display process. The processes of the steps S470, S480, S540, S610 and S620 are an example of the main tab setting process, wherein the step S470 is an example of the main tab selection screen display process. The process of the step S370 is an example of the attribute setting screen display process. The process of the step S380 is an example of the attribute setting process. The process of the step S510 is an example of the initialization receiving process. The process of the step S530 is an example of the attribute determination process.

<Modified Embodiments>

While the embodiment of the present teaching was explained above, the present teaching is not limited to the above embodiment but can be executed in various modified forms.

Figure 11A:
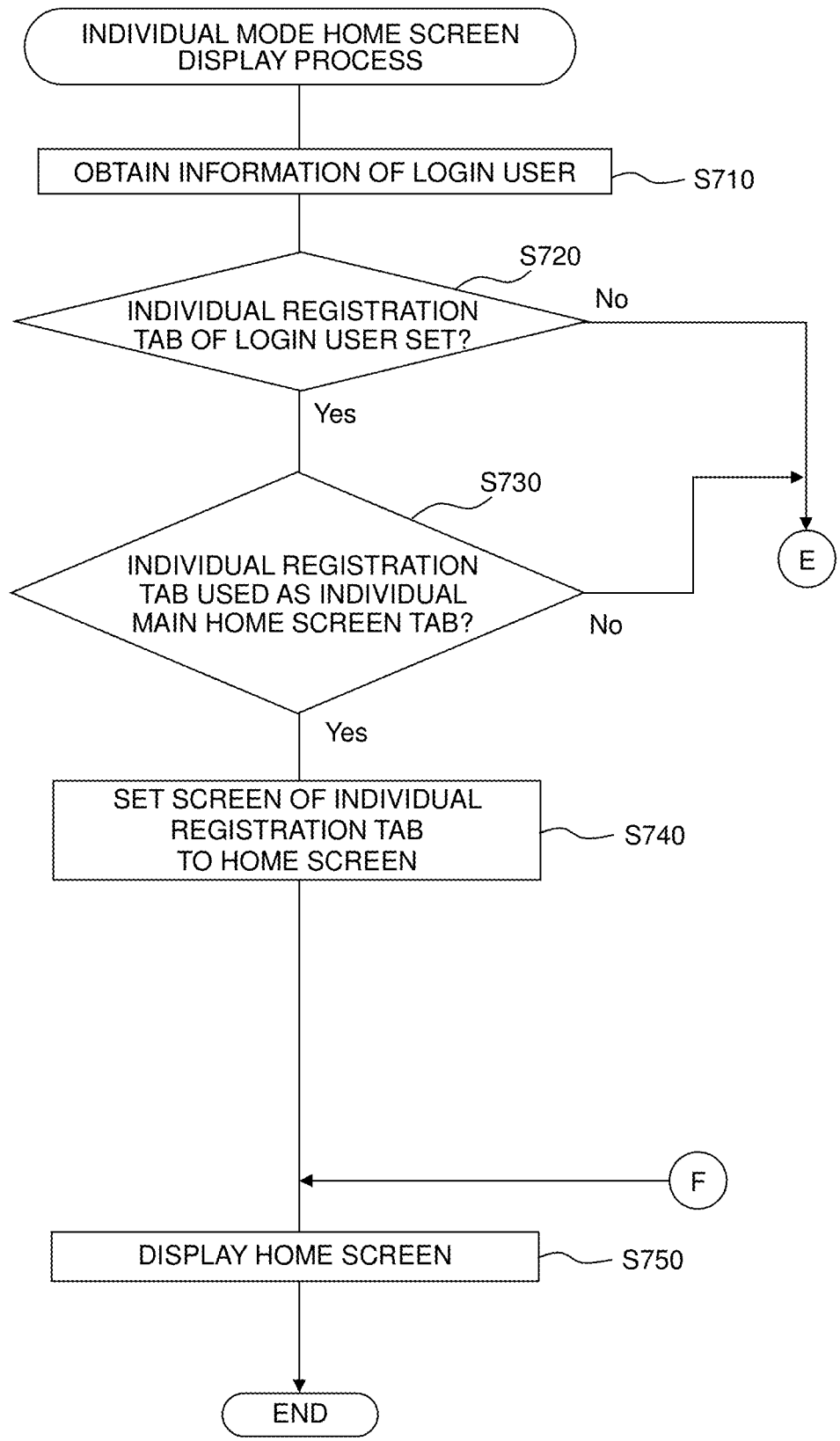
FIGS. 11A and 11B depict a flow chart of an individual mode home screen display process.
Figure 11B:
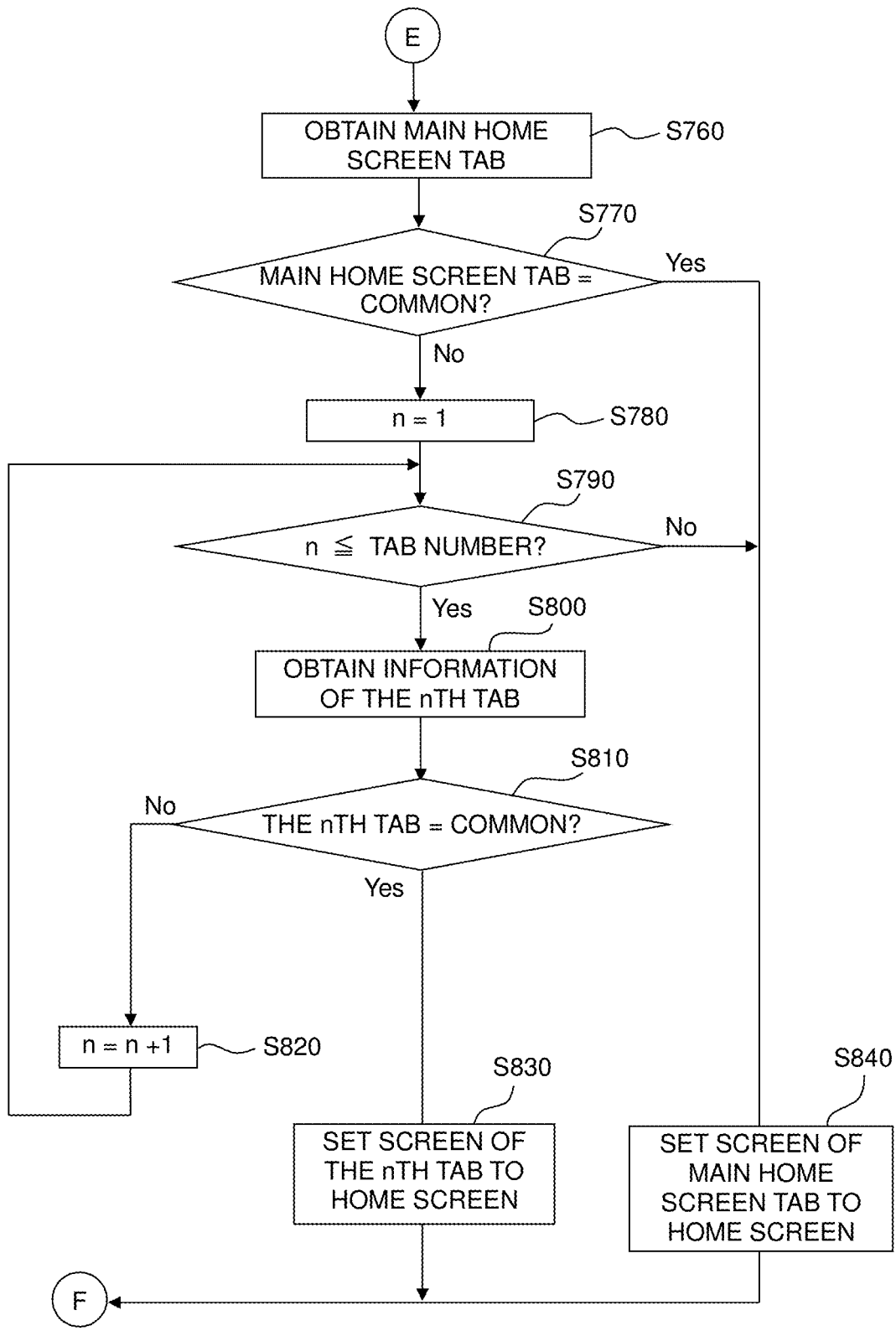

With respect to displaying what kind of home screen at first when switched to the individual mode, that is, displaying which tab set in the selected state, the determination may be made in a different process from the individual mode home screen display process depicted in FIGS. 11A and 11B.

For example, as depicted by the user list of FIG. 3C, any tab for each registered user may be allowed for preregistration as the individual main home screen tab. Then, if the individual main home screen tab is set for the login user, then on the home screen, that individual main home screen tab may be displayed and set to the selected state.

Figure 12A:
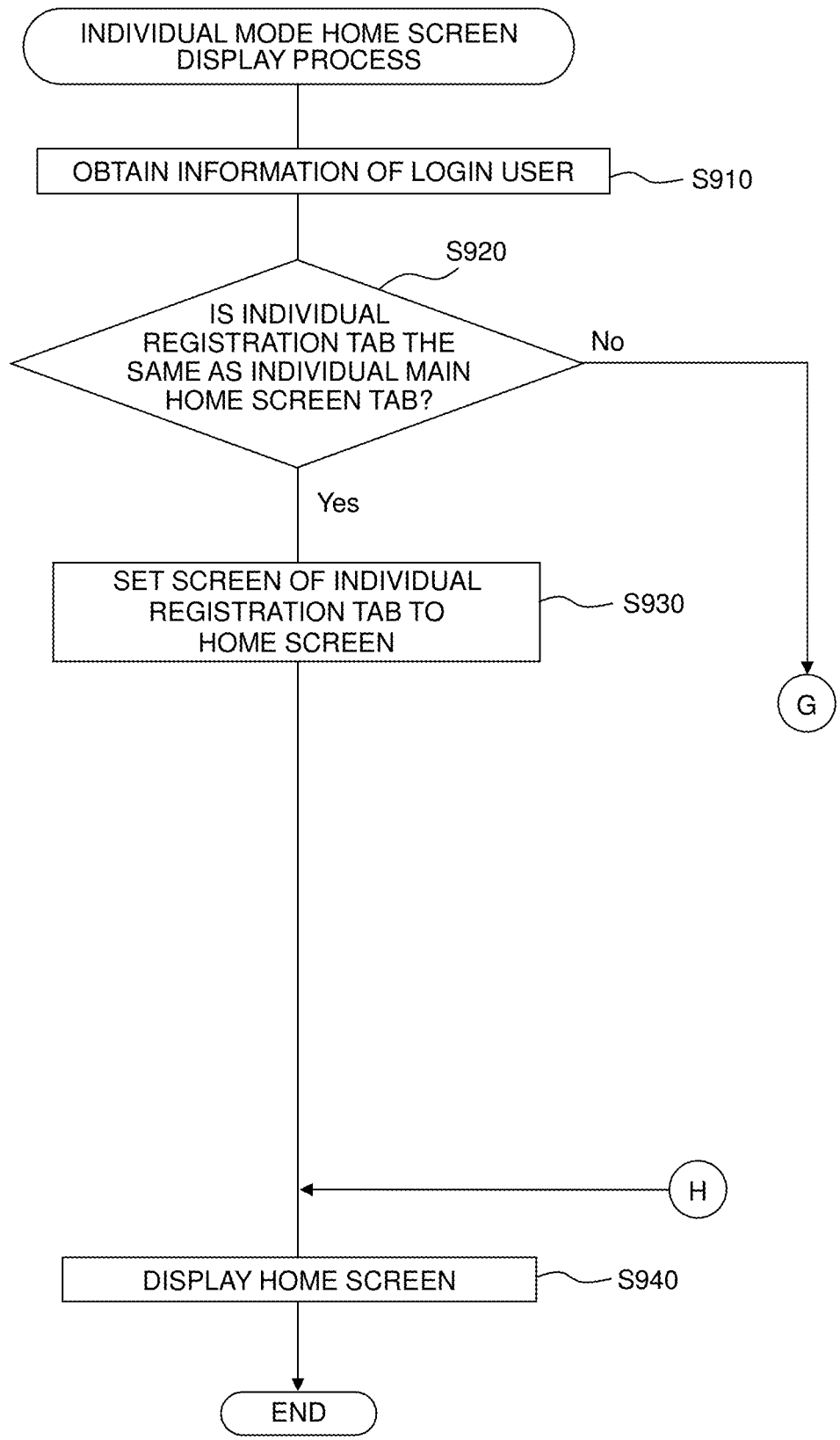
FIGS. 12A and 12B depict a flow chart of another example of the individual mode home screen display process.
Figure 12B:
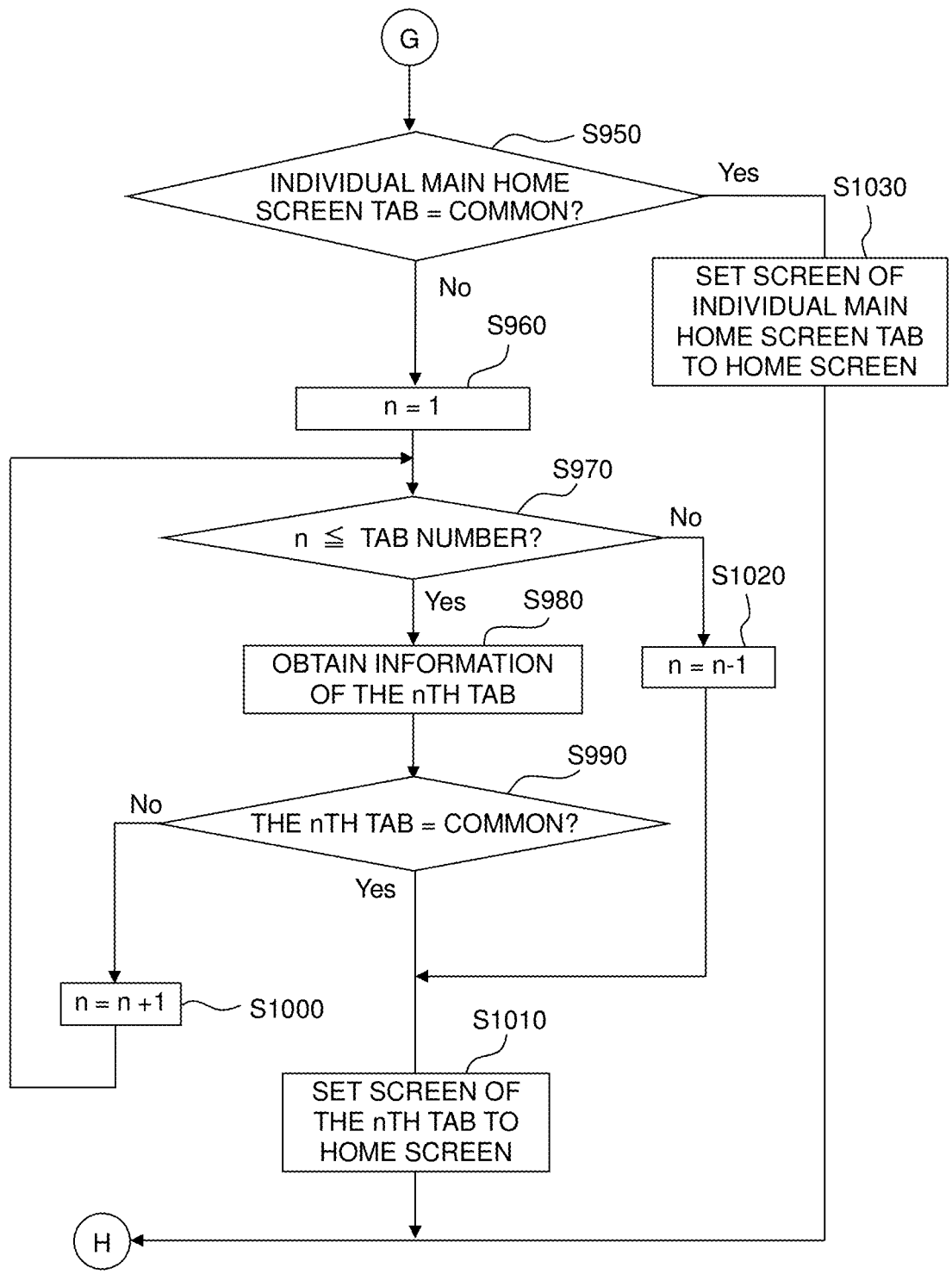

In order to realize this, instead of the individual mode home screen display process of FIGS. 11A and 11B, for example, another individual mode home screen display process depicted in FIGS. 12A and 12B may be carried out to display the home screen. A specific explanation will be made on the individual mode home screen display process depicted in FIGS. 12A and 12B.

If the individual mode home screen display process is started, then in the step S910, the controller 11 obtains the login user's information in the same manner as in the step S710. In the step S920, based on the user list, the controller 11 determines whether or not the individual registration tab of the login user is the same as the individual main home screen tab of the login user.

If the individual registration tab of the login user is the same as the individual main home screen tab of the login user, then the process proceeds to the step S930. On this occasion, the process of S930 and the following process of S940 are the same as the processes of S740 and S750 of FIGS. 11A and 11B.

In the step S920, if the individual registration tab of the login user is different from the individual main home screen tab of the login user, then the process proceeds to the step S950. In S950, the controller 11 determines whether or not the individual main home screen tab is of the common attribute. In particular, the controller 11 obtains the tab attribute corresponding to the obtained individual main home screen tab from the tab setting table stored in the memory 12, and then determines whether or not it is the common attribute. If the individual main home screen tab is of the common attribute, then the process proceeds to the step S1030. In S1030, the controller 11 sets the tab screen of the individual main home screen tab to the home screen, and then the process proceeds to the step S940. On this occasion, in the step S940, according to the contents set in S1030, the home screen 40 is displayed. That is, referring to the tab setting table, the tab set to the home screen in the step S1030 is set to the selected state on the home screen 40 including the tabs of the common attribute, and the individual registration tab of the login user.

In the step S950, if the individual main home screen tab is not of the common attribute, then the process proceeds to the step S960. In S960, the variable n is set to one. In the step S970, the controller 11 determines whether or not the variable n is equal to or less than the total number of tabs. If the variable n is equal to or less than the total number of tabs, then the process proceeds to the step S980. In S980, the controller 11 obtains information of the nth tab from the tab setting table.

In the step S990, based on the information obtained in the step S980, the controller 11 determines whether or not the nth tab is of the common attribute. If the nth tab is not of the common attribute, then in the step S1000, the variable n is incremented by one, and then the process returns to the step S970. If the nth tab is of the common attribute, then the process proceeds to the step S1010.

In the step S1010, the tab screen of the nth tab is set to the home screen. After the step S1010, the process proceeds to the step S940, and the home screen 40 is displayed according to the contents set in the step S1010. In the step S970, if the variable n exceeds the total number of tabs, then the process proceeds to the step S1020. In S1020, the variable n is decremented by one, and the process proceeds to the step S1010.

In the tab attribute setting screen 30 depicted in FIG. 4, the main home setting mark 7 may be designed in any form. Further, instead of adding the main home setting mark 7, it is possible to distinguish the corresponding tab from the other tabs by displaying that tab in the manner of, for example, emphasized presentation, changed color, or the like.

On the main home screen setting screen 35 depicted in FIG. 5, the options for the not selectable tabs may be displayed in any form. Alternatively, the options for the not selectable tabs may not be displayed at all.

Additionally, a number of functions possessed by one component in the above embodiment may be realized by a number of components, or one function possessed by one component may be realized by a number of components. Conversely, a number of functions possessed by a number of components may be realized by one component, or one function possessed by a number of components may be realized by one component.

Further, part of the configuration in the above embodiment may be omitted. Further, at least part of the configuration of the above embodiment may be added to or may substitute the configuration of any of the above modified embodiments.

What is claimed is:

1. An image processing apparatus comprising:
a printer;
a scanner;
a display;
an input interface; and
a controller,
wherein the controller is configured to execute a display process for causing the display to display a standby screen, the standby screen being included in a plurality of screens and configured to be switchable to another screen,
wherein icons, which are images associated with functions respectively, are registered for each of the screens,
wherein one of a common attribute and a personal attribute is set to each of the screens,
wherein a specific registered user is registered for each of the screens,
wherein the icons include at least one icon associated with a printing function of the printer and at least one icon associated with a scanning function of the scanner,
wherein the controller is further configured to execute:
a main screen setting process for setting one of the screens as a main screen; and
a user mode setting process for setting a user mode for the image processing apparatus to one of an ordinary mode in which no registered user has logged in to the image processing apparatus and an individual mode in which a registered user has logged in to the image processing apparatus, and for setting the user mode to the individual mode in accordance with an input of user authentication information corresponding to the registered user via the input interface,
wherein the display process includes:
a first display process for causing the display to display the standby screen in accordance with the user mode being set to the ordinary mode; and
a second display process for causing the display to display the standby screen in accordance with the user mode being set to the individual mode,
wherein in a case that the controller executes the first display process,
a common attribute screen set with the common attribute is displayed as the standby screen, but no personal attribute screen set with the personal attribute is displayed in the display,
if the main screen is set with the common attribute, then the main screen is displayed as the standby screen, and
if the main screen is set with the personal attribute, then the main screen is not displayed and another common attribute screen is displayed as the standby screen, and wherein in a case that the controller executes the second display process,
a personal attribute screen registered with the registered user is displayed as the standby screen, and
no personal attribute screen registered with another registered user is displayed as the standby screen.

2. The image processing apparatus according to claim 1, wherein in the first display process, if the main screen is set with the personal attribute, then the controller is configured to display the other common attribute screen, which is other than the main screen and registered with the icons, as the standby screen.

3. The image processing apparatus according to claim 1,
wherein the main screen setting process includes a main screen selection screen display process for causing the display to display a main screen selection screen,
wherein the main screen selection screen includes screens set with the common attribute as options, and does not include any screens set with the personal attribute as the options, and
wherein in the main screen setting process, the controller is configured to set one screen, which is selected via the input interface among the screens displayed as the options on the main screen selection screen, as the main screen.

4. The image processing apparatus according to claim 1, wherein the controller is further configured to execute:
an attribute setting screen display process for causing the display to display an attribute setting screen including a selection image for selecting attributes via the input interface for each of the screens, and for adding a specific mark to the selection image corresponding to the main screen; and
an attribute setting process for setting the attributes of the screens to one of the common attribute and the personal attribute selected via the input interface on the attribute setting screen.

5. The image processing apparatus according to claim 1, wherein the controller is further configured to execute:
an initialization receiving process for receiving an initialization instructing operation via the input interface to set the standby screen displayed through the display process to a specific initial state; and
an attribute determination process for determining an attribute of a preset initial setting screen if the initialization instructing operation is received in the initialization receiving process, and
wherein in the main screen setting process, the controller is configured to set the preset initial setting screen as the main screen in accordance with the preset initial setting screen being determined as having the common attribute in the attribute determination process, and to set the preset initial setting screen as the common attribute screen other than the main screen in accordance with the preset initial setting screen being determined as having the personal attribute in the attribute determination process.

6. The image processing apparatus according to claim 1, further comprising a first memory storing individual mode information,
wherein the individual mode information indicates which one is displayed as the standby screen between the main screen and the personal attribute screen registered with the registered user corresponding to the individual mode, in the standby screen displayed through the second display process in the individual mode, and
wherein in the second display process, the controller is configured to cause the display to display one of the main screen and the personal attribute screen registered with the registered user corresponding to the set individual mode as the standby screen, based on the individual mode information stored in the first memory.

7. The image processing apparatus according to claim 1, further comprising a second memory storing selection designation information,
wherein the selection designation information indicates a selection designation screen to be set as the standby screen in the second display process for each registered user, and wherein in the second display process, the controller is configured to cause the display to display the standby screen where the selection designation screen for the registered user corresponding to the set individual mode is set as the standby screen, based on the selection designation information stored in the second memory.

8. A display control method of an image processing apparatus including; a printer; a scanner; a display; and an input interface, the method comprising:
displaying a standby screen, the standby screen being included in a plurality of screens and configured to be switchable to another screen,
wherein icons, which are images associated with functions respectively, are registered for each of the screens,
wherein one of a common attribute and a personal attribute is set to each of the screens,
wherein a specific registered user is registered for each of the screens,
wherein the icons include at least one icon associated with a printing function of the printer and at least one icon associated with a scanning function of the scanner,
wherein the display control method further comprises:
setting one of the screens as a main screen; and
setting a user mode for the image processing apparatus to one of an ordinary mode in which no registered user has logged in to the image processing apparatus and an individual mode in which a registered user has logged in to the image processing apparatus, and setting the user mode to the individual mode in accordance with an input of user authentication information corresponding to the registered user via the input interface,
wherein displaying the standby screen includes:
displaying the standby screen on the display in accordance with the user mode being set to the ordinary mode; and
displaying the standby screen on the display in accordance with the user mode being set to the individual mode,
wherein when displaying the standby screen on the display in accordance with the user mode being set to the ordinary mode,
a common attribute screen set with the common attribute is displayed as the standby screen, but no personal attribute screen set with the personal attribute is displayed in the display,
if the main screen is set with the common attribute, then the main screen is displayed as the standby screen, and
if the main screen is set with the personal attribute, then the main screen is not displayed and another common attribute screen is displayed as the standby screen, and
wherein when displaying the standby screen on the display in accordance with the user mode being set to the individual mode,
a personal attribute screen registered with the registered user is displayed as the standby screen, and
no personal attribute screen registered with another registered user is displayed as the standby screen.

9. The display control method according to claim 8, wherein when displaying the standby screen on the display in accordance with the user mode being set to the ordinary mode, if the main screen is set with the personal attribute, then the other common attribute screen, which is other than the main screen and registered with the icons, is displayed as the standby screen.

10. The display control method according to claim 8,
    wherein setting one of the screens as the main screen includes causing the display to display a main screen selection screen,
    wherein the main screen selection screen includes screens set with the common attribute as options, and does not include any screens set with the personal attribute as the options, and
    wherein when setting one of the screens as the main screen, one screen, which is selected among the screens displayed as the options on the main screen selection screen, is set as the main screen.

11. The display control method according to claim 8, further comprising:
    receiving an initialization instructing operation to set the standby screen displayed to a specific initial state; and
    determining an attribute of a preset initial setting screen if the initialization instructing operation is received, and
    wherein when setting one of the screens as the main screen, the preset initial setting screen is set as the main screen in accordance with the preset initial setting screen being determined as having the common attribute, and the preset initial setting screen is set as the common attribute screen other than the main screen in accordance with the preset initial setting screen being determined as having the personal attribute.

12. The display control method according to claim 8, further comprising storing individual mode information in a first memory,
    wherein the individual mode information indicates which one is displayed as the standby screen between the main screen and the personal attribute screen registered with the registered user corresponding to the individual mode, in the standby screen displayed in the individual mode, and
    wherein when displaying the standby screen on the display in accordance with the user mode being set to the individual mode, the display displays one of the main screen and the personal attribute screen registered with the registered user corresponding to the set individual mode as the standby screen, based on the individual mode information stored in the first memory.

13. The display control method according to claim 8, further comprising storing selection designation information in a second memory,
    wherein the selection designation information indicates a selection designation screen to be set as the standby screen for each registered user when displaying the standby screen on the display in accordance with the user mode being set to the individual mode, and
    wherein when displaying the standby screen on the display in accordance with the user mode being set to the individual mode, displaying the standby screen where the selection designation screen for the registered user corresponding to the set individual mode is set as the standby screen, based on the selection designation information stored in the second memory.

14. A non-transitory medium storing a program executable by a processor of an image processing apparatus including: a printer; a scanner; a display; an input interface; and a controller, the program, when executed by the processor, causing the controller to execute:
    a display process for displaying a standby screen on the display, the standby screen being included in a plurality of screens and configured to be switchable to another screen,
    wherein icons, which are images associated with functions respectively, are registered for each of the screens,
    wherein one of a common attribute and a personal attribute is set to each of the screens,
    wherein a specific registered user is registered for each of the screens,
    wherein the icons include at least one icon associated with a printing function of the printer and at least one icon associated with a scanning function of the scanner,
    wherein the program, when executed by the processor, further causing the controller to execute:
        a main screen setting process for setting one of the screens as a main screen; and
        a user mode setting process for setting a user mode for the image processing apparatus to one of an ordinary mode in which no registered user has logged in to the image processing apparatus and an individual mode in which a registered user has logged in to the image processing apparatus, and for setting the user mode to the individual mode in accordance with an input of user authentication information corresponding to the registered user via the input interface,
    wherein the display process includes:
        a first display process for displaying the standby screen on the display in accordance with the user mode being set to the ordinary mode; and
        a second display process for displaying the standby screen on the display in accordance with the user mode being set to the individual mode,
    wherein in the first display process,
        a common attribute screen set with the common attribute is displayed as the standby screen, but no personal attribute screen set with the personal attribute is displayed in the display;
        if the main screen is set with the common attribute, then the main screen is displayed as the standby screen; and
        if the main screen is set with the personal attribute, then the main screen is not displayed and another common attribute screen is displayed as the standby screen, and
    wherein in the second display process,
        a personal attribute screen registered with the registered user is displayed as the standby screen, and
        no personal attribute screen registered with another registered user is displayed as the standby screen.

15. The medium according to claim 14, wherein in the first display process, if the main screen is set with the personal attribute, then the program, when executed by the processor, causes the controller to display the other common attribute screen, which is other than the main screen and registered with the icons, as the standby screen.

16. The medium according to claim 14,
    wherein the main screen setting process includes a main screen selection screen display process for causing the display to display a main screen selection screen,
    wherein the main screen selection screen includes screens set with the common attribute as options, and does not include any screens set with the personal attribute as the options, and
    wherein in the main screen setting process, the program, when executed by the processor, causes the controller to set one screen, which is selected via the input interface among the screens displayed as the options on the main screen selection screen, as the main screen.

17. The medium according to claim 14, wherein the program, when executed by the processor, further causes the controller to execute:
an initialization receiving process for receiving an initialization instructing operation via the input interface to set the standby screen displayed through the display process to a specific initial state; and
an attribute determination process for determining an attribute of a preset initial setting screen if the initialization instructing operation is received in the initialization receiving process, and
wherein in the main screen setting process, the program, when executed by the processor, causes the controller to set the preset initial setting screen as the main screen in accordance with the preset initial setting screen being determined as having the common attribute in the attribute determination process, and to set the preset initial setting screen as the common attribute screen other than the main screen in accordance with the preset initial setting screen being determined as having the personal attribute in the attribute determination process.

18. The medium according to claim 14, wherein the image processing apparatus further comprises a first memory storing individual mode information,
wherein the individual mode information indicates which one is displayed as the standby screen between the main screen and the personal attribute screen registered with the registered user corresponding to the individual mode, in the standby screen displayed through the second display process in the individual mode, and
wherein in the second display process, the program, when executed by the processor, causes the controller to display one of the main screen and the personal attribute screen registered with the registered user corresponding to the set individual mode as the standby screen, based on the individual mode information stored in the first memory.

19. The medium according to claim 14, wherein the image processing apparatus further comprises a second memory storing selection designation information,
wherein the selection designation information indicates a selection designation screen to be set as the standby screen in the second display process for each registered user, and
wherein in the second display process, the program, when executed by the processor, causes the controller to display the standby screen where the selection designation information for the registered user corresponding to the set individual mode is set as the standby screen, based on the selection designation information stored in the second memory.

20. An image processing apparatus comprising:
a printer;
a user interface; and
a controller,
wherein in a case that no user has logged in to the image processing apparatus, the controller is configured to:
cause the user interface to display a first main screen, the first main screen being selected from a plurality of screens each of which is associated with no user; and
in a case of receiving an instruction to switch the first main screen via the user interface in a state of the first main screen being displayed in the user interface, cause the user interface to switch the first main screen to another screen which has not been selected as the first main screen, the other screen being included in the plurality of screens each of which is associated with no user, and
wherein in a case that a user has logged in to the image processing apparatus, the controller is configured to:
cause the user interface to display a second main screen, the second main screen being selected from a group consisting of a plurality of screens each of which is associated with the user and a plurality of screens each of which is associated with no user; and
in a case of receiving an instruction to switch the second main screen via the user interface in a state of the second main screen being displayed in the user interface, cause the user interface to switch the second main screen to still another screen which has not been selected as the second main screen, the still another screen being included in the group consisting of the plurality of screens each of which is associated with the user and the plurality of screens each of which is associated with no user.

21. An image processing apparatus comprising:
a printer;
a user interface; and
a controller configured to:
in a case that a user has logged in to the image processing apparatus,
cause the user interface to display a main screen, the main screen being selected from a group consisting of a plurality of screens each of which is associated with the user and a plurality of screens each of which is associated with no user; and
in a case of receiving an instruction to switch the main screen via the user interface in a state of the main screen being displayed in the user interface, cause the user interface to switch the main screen to another screen which has not been selected as the main screen, the other screen being included in the group consisting of the plurality of screens each of which is associated with the user and the plurality of screens each of which is associated with no user.

22. An image processing apparatus comprising:
a printer;
a user interface; and
a controller configured to:
in a case that a user has logged in to the image processing apparatus,
cause the user interface to display a main screen, the main screen being selected from a group consisting of a plurality of screens each of which is associated with the user and a plurality of screens each of which is associated with no user.

23. An image processing apparatus comprising:
a printer;
a user interface; and
a controller configured to:
in a case that a user has logged in to the image processing apparatus,
cause the user interface to display a main screen, the main screen being selected from a plurality of screens each of which is associated with at least a login user logged in to the image processing apparatus.

24. An image processing apparatus comprising:

a printer;

a user interface; and a controller configured to:

in a case that a user has logged in to the image processing apparatus,

- cause the user interface to display a main screen associated with the user logged in to the image processing apparatus, the main screen being one of a plurality of ordered screens and being neither a top screen nor a last screen of the plurality of ordered screens, the main screen being displayed on the user interface in a state of being switchable to a previous screen previous to the main screen and a next screen next to the main screen;

- in a case of receiving an operation by the user on the main screen to switch the main screen to the previous screen, cause the user interface to display the previous screen; and

- in a case of receiving an operation by the user on the main screen to switch the main screen to the next screen, cause the user interface to display the next screen.

* * * * *